(12) United States Patent
Sobecki et al.

(10) Patent No.: US 12,258,797 B2
(45) Date of Patent: Mar. 25, 2025

(54) VEHICULAR FLUSH DOOR HANDLE ASSEMBLY WITH VARIABLE SPEED ACTUATOR

(71) Applicant: Magna Mirrors of America, Inc., Holland, MI (US)

(72) Inventors: Justin E. Sobecki, Rockford, MI (US); Connor G. Cervone, Byron Center, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 355 days.

(21) Appl. No.: 17/660,421

(22) Filed: Apr. 25, 2022

(65) Prior Publication Data
US 2022/0341226 A1 Oct. 27, 2022

Related U.S. Application Data

(60) Provisional application No. 63/201,346, filed on Apr. 26, 2021.

(51) Int. Cl.
| | |
|---|---|
| *E05B 85/10* | (2014.01) |
| *H02K 7/116* | (2006.01) |
| *H02K 7/14* | (2006.01) |
| *E05B 81/34* | (2014.01) |

(52) U.S. Cl.
CPC ............ *E05B 85/107* (2013.01); *H02K 7/116* (2013.01); *H02K 7/14* (2013.01)

(58) Field of Classification Search
CPC ...... E05B 85/10; E05B 85/103; E05B 85/107; E05B 81/28; E05B 81/34; F16H 25/20; F16H 2025/2028

USPC .................................................. 310/12.01
See application file for complete search history.

(56) References Cited

U.S. PATENT DOCUMENTS

| | | | |
|---|---|---|---|
| 5,123,687 | A | 6/1992 | Pfeiffer et al. |
| 5,371,659 | A | 12/1994 | Pastrick et al. |
| 5,497,305 | A | 3/1996 | Pastrick et al. |
| 5,497,306 | A | 3/1996 | Pastrick |
| 5,669,699 | A | 9/1997 | Pastrick et al. |
| 5,671,996 | A | 9/1997 | Bos et al. |
| 5,786,772 | A | 7/1998 | Schofield et al. |

(Continued)

FOREIGN PATENT DOCUMENTS

| | | | | |
|---|---|---|---|---|
| CN | 102562992 A | * | 7/2012 | ............ F16H 25/20 |
| CN | 111827811 A | * | 10/2020 | |

(Continued)

*Primary Examiner* — Carlos Lugo
(74) *Attorney, Agent, or Firm* — HONIGMAN LLP

(57) ABSTRACT

A vehicular exterior door handle assembly includes a base portion disposed at a handle region of a vehicle door, a handle, and an actuator. The actuator includes an electrically-operable motor, an output element mechanically coupled to the handle, and a variable drive element coupled to the output element. When the motor is operated, the actuator causes the drive element to move the output element and move the handle from a recessed position to a deployed position. When moving the handle from the recessed position, the drive element moves the output element at a first speed to move the handle. When the motor is operated to further move the handle, the drive element moves the output element at a second speed to more rapidly move the handle from a partially deployed position toward a deployed position.

32 Claims, 16 Drawing Sheets

(56) References Cited

U.S. PATENT DOCUMENTS

| | | | |
|---|---|---|---|
| 5,823,654 A | 10/1998 | Pastrick et al. | |
| 5,929,786 A | 7/1999 | Schofield et al. | |
| 5,938,321 A | 8/1999 | Bos et al. | |
| 6,086,229 A | 7/2000 | Pastrick | |
| 6,139,172 A | 10/2000 | Bos et al. | |
| 6,149,287 A | 11/2000 | Pastrick et al. | |
| 6,152,590 A | 11/2000 | Furst et al. | |
| 6,176,602 B1 | 1/2001 | Pastrick et al. | |
| 6,198,409 B1 | 3/2001 | Schofield et al. | |
| 6,227,689 B1 | 5/2001 | Miller | |
| 6,229,233 B1 | 5/2001 | Torii et al. | |
| 6,259,175 B1 * | 7/2001 | Alfano | F16H 25/2021 310/20 |
| 6,276,821 B1 | 8/2001 | Pastrick et al. | |
| 6,280,069 B1 | 8/2001 | Pastrick et al. | |
| 6,291,905 B1 | 9/2001 | Drummond et al. | |
| 6,349,450 B1 | 2/2002 | Koops et al. | |
| 6,390,264 B2 | 5/2002 | Torii et al. | |
| 6,396,408 B2 | 5/2002 | Drummond et al. | |
| 6,416,208 B2 | 7/2002 | Pastrick et al. | |
| 6,477,464 B2 | 11/2002 | McCarthy et al. | |
| 6,550,103 B2 | 4/2003 | Koops et al. | |
| 6,568,839 B1 | 5/2003 | Pastrick et al. | |
| 6,582,109 B2 | 6/2003 | Miller | |
| 6,879,065 B2 * | 4/2005 | Corbett, Jr. | H02K 29/03 74/89.41 |
| 6,907,643 B2 | 6/2005 | Koops et al. | |
| 6,977,619 B2 | 12/2005 | March et al. | |
| 7,407,203 B2 | 8/2008 | Huizenga et al. | |
| 7,421,922 B2 * | 9/2008 | Hamann | F16H 25/20 74/426 |
| 7,492,281 B2 | 2/2009 | Lynam et al. | |
| 7,581,859 B2 | 9/2009 | Lynam | |
| 7,626,749 B2 | 12/2009 | Baur et al. | |
| 7,944,371 B2 | 5/2011 | Foote et al. | |
| 8,058,977 B2 | 11/2011 | Lynam | |
| 8,333,492 B2 | 12/2012 | Dingman et al. | |
| 8,786,401 B2 | 7/2014 | Sobecki et al. | |
| 8,786,704 B2 | 7/2014 | Foote et al. | |
| 9,605,452 B2 | 3/2017 | Yoshino et al. | |
| 10,550,611 B2 | 2/2020 | Och | |
| 10,759,290 B2 * | 9/2020 | Sha | E05F 15/603 |
| 11,536,058 B2 * | 12/2022 | Han | E05B 85/103 |
| 11,549,288 B2 * | 1/2023 | Grenouillat | E05B 81/74 |
| 11,578,514 B2 * | 2/2023 | Han | E05B 79/06 |
| 11,680,432 B2 | 6/2023 | Sobecki | |
| 2010/0007463 A1 | 1/2010 | Dingman et al. | |
| 2011/0148575 A1 | 6/2011 | Sobecki et al. | |
| 2016/0084360 A1 * | 3/2016 | Foucaut | F16H 25/24 74/89.23 |
| 2016/0298366 A1 | 10/2016 | Och | |
| 2018/0106082 A1 | 4/2018 | Brown et al. | |
| 2020/0102773 A1 | 4/2020 | Sobecki | |
| 2022/0018168 A1 | 1/2022 | Cervone et al. | |
| 2022/0282534 A1 | 9/2022 | Peterson et al. | |

FOREIGN PATENT DOCUMENTS

| | | | | |
|---|---|---|---|---|
| DE | 102018129403 A1 * | 5/2019 | | E05F 15/622 |
| DE | 102021213456 A1 * | 6/2023 | | B60N 2/02253 |
| EP | 3255231 A1 * | 12/2017 | | E05B 85/103 |

* cited by examiner

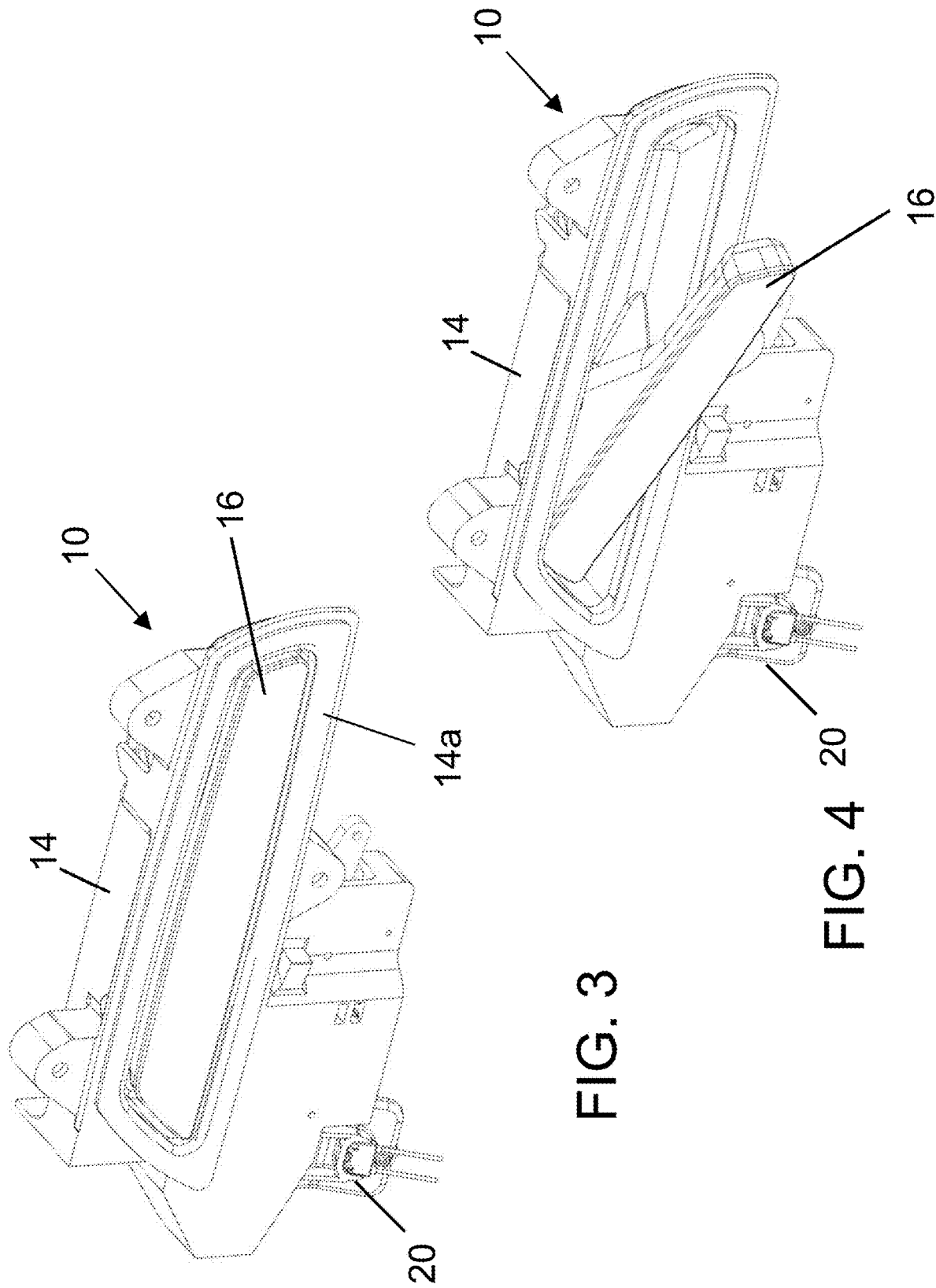

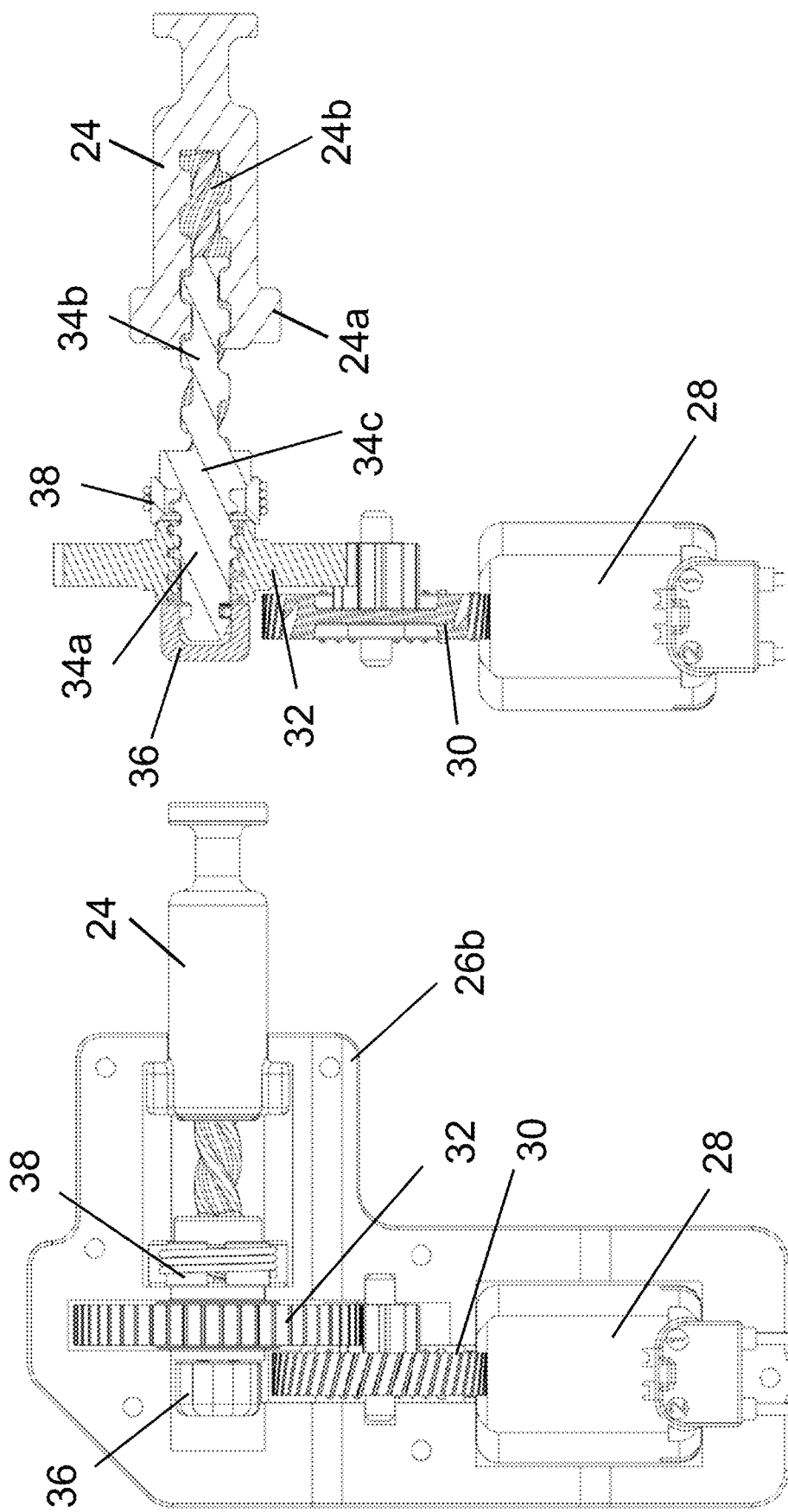

VEHICULAR FLUSH DOOR HANDLE ASSEMBLY WITH VARIABLE SPEED ACTUATOR

CROSS REFERENCE TO RELATED APPLICATION

The present application claims the filing benefits of U.S. provisional application Ser. No. 63/201,346, filed Apr. 26, 2021, which is hereby incorporated herein by reference in its entirety.

FIELD OF THE INVENTION

The present invention relates to handles for vehicles and, more particularly, to an exterior handle for opening a side door and/or liftgate of a vehicle.

BACKGROUND OF THE INVENTION

A door handle for a vehicle door typically includes a handle portion that is pivotable relative to a base portion, whereby pivotal movement of the handle portion actuates a latch mechanism to open the door. Typically, a door handle is a pull strap handle with a strap handle portion that protrudes outwardly from the side of the vehicle for grasping by the person opening the door of the vehicle. Alternately, paddle type door handle assemblies are known, where a paddle portion is pivotally mounted to a base portion and is pulled generally outwardly and upwardly to open the vehicle door. Such paddle type door handle assemblies typically protrude outwardly from the vehicle door when in their unpulled state and have an open recess below the paddle portion for receiving a user's fingers for grasping the paddle portion.

SUMMARY OF THE INVENTION

An extendable flush door handle assembly for opening a door of a vehicle (such as a side door or rear door or liftgate of a vehicle) includes a handle portion that is disposed at the door such that, when not in use to open the vehicle door, the handle portion is recessed at the door, with the outer surface of the handle portion generally flush with or generally coplanar with (or only slightly protruding from or slightly recessed in) the outer surface of the door panel at the door handle region of the door. The door handle assembly is operable to extend or move or pivot the handle portion outward from the door panel when a user is to use the handle to open the vehicle door, such as in response to a signal from a key fob or a passive entry system or the like. When so extended or moved to a deployed position, the handle may be readily grasped by the user and actuated or pulled or moved further outward to open the vehicle door. After the user releases the handle, the handle may return to its non-use or partially recessed position where its outer surface is generally flush or coplanar with (or only slightly protruding from of recessed in) the outer surface of the door panel.

The door handle assembly includes an actuator including an electrically-operable motor that is electrically operable in response to an input signal. The actuator includes an output element mechanically coupled to the handle portion and a variable drive element coupled between the motor and the output element. When the motor is electrically operated, the actuator drives the variable drive element to move the output element and to move the handle portion between the recessed position and the deployed position. When the motor is electrically operated to move the handle portion from the recessed position, the variable drive element moves the output element at a first speed toward a partially deployed position of the door handle. When the motor is electrically operated to further deploy the handle from the partially deployed position, the variable drive element moves the output element at a second speed that is faster than the first speed to more rapidly move the handle portion from the partially deployed state toward the deployed position of the door handle.

These and other objects, advantages, purposes and features of the present invention will become apparent upon review of the following specification in conjunction with the drawings.

BRIEF DESCRIPTION OF THE DRAWINGS

FIG. 3 is a perspective view of the extendable flush door handle assembly and actuator, shown with the handle in its flush position;

FIG. 4 is another perspective view of the extendable flush door handle assembly and actuator, shown with the handle in its deployed position;

FIG. 17 is a plan view of the actuator, with the actuator fully extended via the low torque and high speed further extension of the actuator;

FIG. 18 is a sectional view of the actuator of FIG. 17;

DESCRIPTION OF THE PREFERRED EMBODIMENTS

Figure 1:
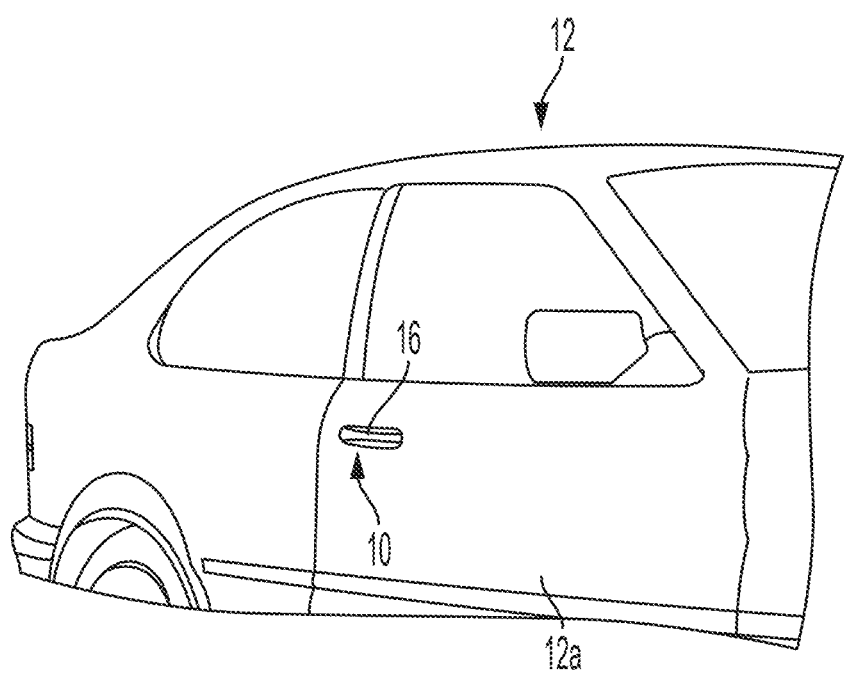
FIG. 1 is a perspective view of a vehicle with an extendable flush door handle assembly.
Figure 2:
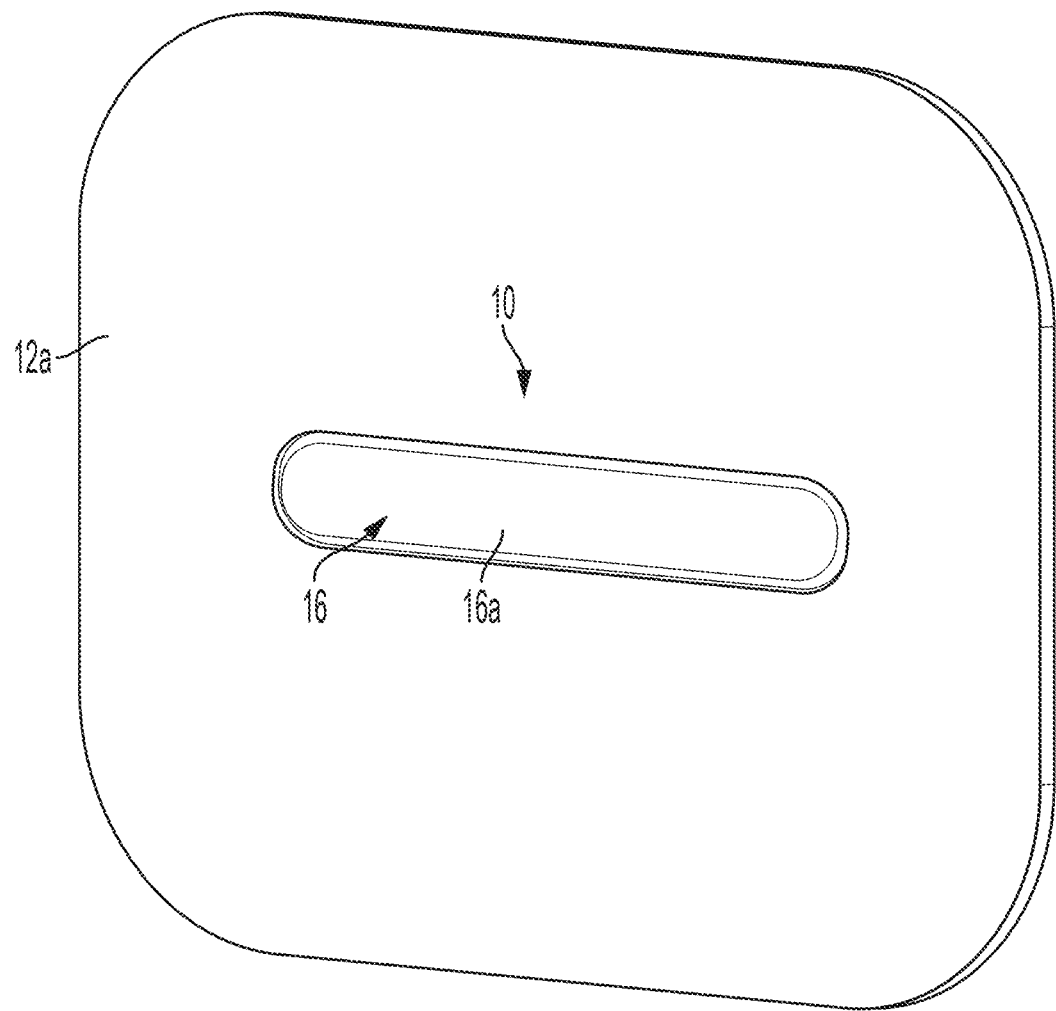
FIG. 2 is an enlarged perspective view of the extendable flush door handle assembly of FIG. 1 at the vehicle door, with the door handle in its flush or non-use or recessed position.

Referring now to the drawings and the illustrative embodiments depicted therein, a vehicular handle assembly or module or unit or extendable flush door handle assembly 10 is mountable to a door 12a of a vehicle 12 and operable to release a latch mechanism of the vehicle door 12a to open the vehicle door (FIGS. 1 and 2). The vehicular handle assembly 10 includes a base portion or bracket 14 that is mountable to the vehicle door 12a and a handle or strap portion 16 that is pivotally mounted to the bracket 14 (FIGS. 3 and 4). When not in use, the handle portion 16 is at an initial rest or recessed or non-use position and is received or disposed at or partially in the base portion 14 so that an outer surface 16a of the handle portion 16 is generally flush with or generally coplanar with (or protruding only slightly from or recessed slightly in) the outer surface 14a of the base portion 14 or the door panel 12a, whereby handle portion 16 is not readily usable by a user (FIGS. 2 and 3). The handle portion 16 is electromechanically pivotable or movable or laterally movable relative to the door and the base portion 14 to move to its ready or operational or grippable or graspable or person-operable position and is then graspable or grippable by a user where the handle portion 16 may be manually moved (such as via pulling by the user) to actuate a bellcrank 18 at the base portion 14, which in turn actuates or releases the latch mechanism of the door to open the vehicle door. The handle assembly 10 includes an electrically operable or electromechanical actuator 20 at the base portion 14 for imparting the pivotal movement of the handle portion 16 relative to the base portion 14 (such as automatically imparting such handle movement in response to a signal from a key fob or a passive entry system or the like) so that the handle portion 16 is automatically moved from its recessed position to its ready or graspable position where a user can grasp the handle portion to pull or move the handle portion for unlatching and/or opening the vehicle door and/or the like, as discussed below.

The handle assembly 10 may comprise any suitable type of handle assembly, and may include or incorporate aspects of the door handle assemblies described in U.S. Pat. Nos. 8,786,401; 6,977,619; 7,407,203 and/or 8,333,492, and/or U.S. Publication Nos. US-2022-0018168 and/or US-2020/0102773, and/or U.S. patent application Ser. No. 17/653,142, filed Mar. 2, 2022, which are all hereby incorporated herein by reference in their entireties. Optionally, aspects of the handle assembly 10 and/or the actuator 20 may be suitable for use with a liftgate handle assembly for a liftgate or tailgate of a vehicle. Although shown and described as a variable torque/variable speed actuator for pivoting the door handle, the actuator and handle mechanism may be configured to cause lateral or non-pivoting movement of the door handle relative to the base portion.

Figure 6:
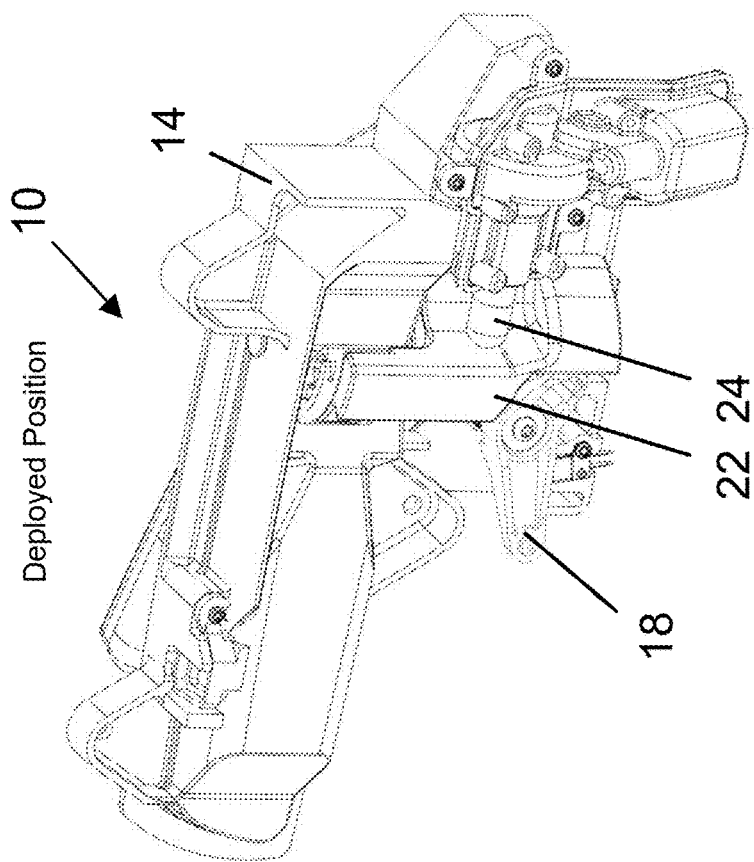
FIG. 6 is another perspective view of the extendable flush door handle assembly and actuator of FIG. 4, shown with the handle in its deployed position.
Figure 5:
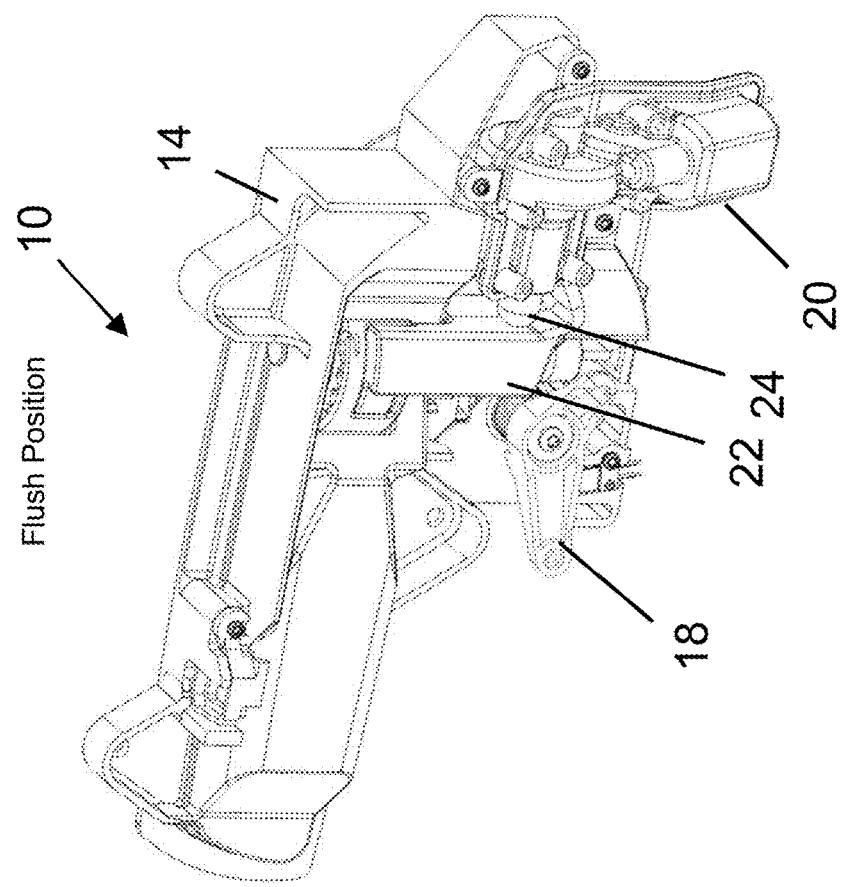
FIG. 5 is another perspective view of the extendable flush door handle assembly and actuator of FIG. 3, shown with the handle in its flush position.

In the illustrated embodiment, the handle or strap portion 16 is pivotally mounted at the base portion 14 and includes a grasping portion for a user to grab and pull at when the handle portion 16 is pivoted to its graspable position to open the vehicle door 12a. As shown in FIGS. 3 and 4, when the handle portion 16 is pivoted from its non-use or recessed position (FIG. 3) to its graspable position (FIG. 4), the handle portion 16 is at least partially extended from the base portion 14 and the door panel to be exposed and graspable by the user at the side of the door. The handle portion 16 includes an actuator-engaging portion or element 22 (FIGS. 5 and 6) disposed inboard of the pivot axis of the handle portion and configured to be engaged by an output element or plunger or actuating member 24 of the actuator 20. The actuator 20 operates to extend and retract the plunger 24 to impart movement of the actuator-engaging portion 22, which in turn imparts pivotal movement of the handle portion 16. For example, the actuator 20 may operate to extend the plunger 24 to pivot the handle portion 16 outward, and may retract the plunger 24 to allow the handle portion 16 to pivot back toward and to the flush position (such as via a spring or biasing element that biases or urges the handle portion 16 toward the flush position when the plunger 24 is retracted). The actuator 20 operates to initially slowly extend the plunger 24 (at higher torque or force), and then more rapidly extend the plunger 24 (at lower torque or force) to provide a variable speed (and torque/force) plunger, as discussed below. The actuator 20 thus may provide an initial higher torque output to break the handle free in situations where the handle portion 16 is frozen or otherwise has ice or other elements (beyond the spring force that is applied to the handle to hold the handle in the recessed position) blocking or inhibiting extension of the handle portion 16 toward the deployed position.

Figure 6A:
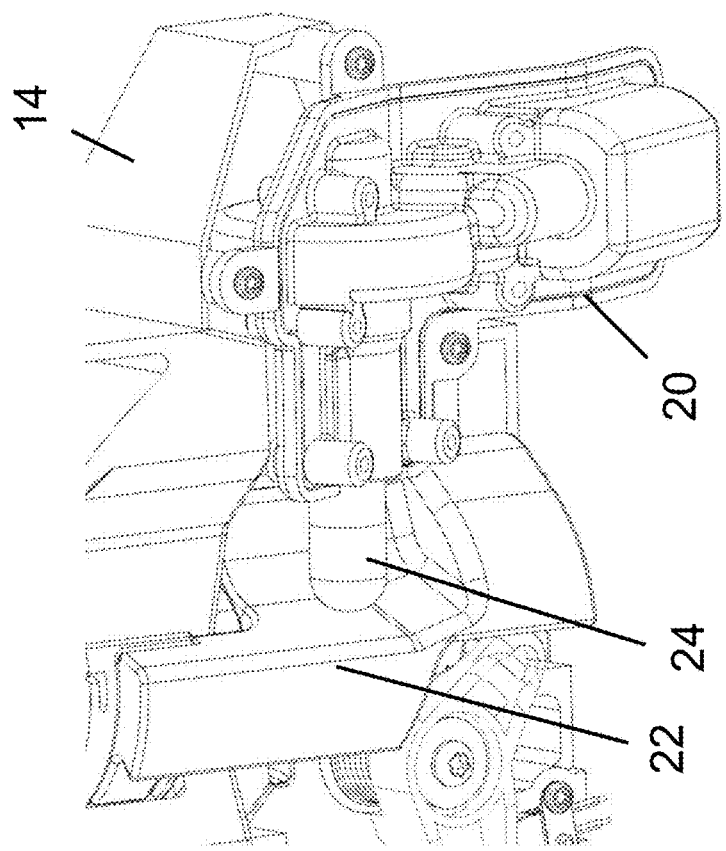
FIG. 6A is an enlarged perspective view of the actuator of FIG. 6.
Figure 5A:
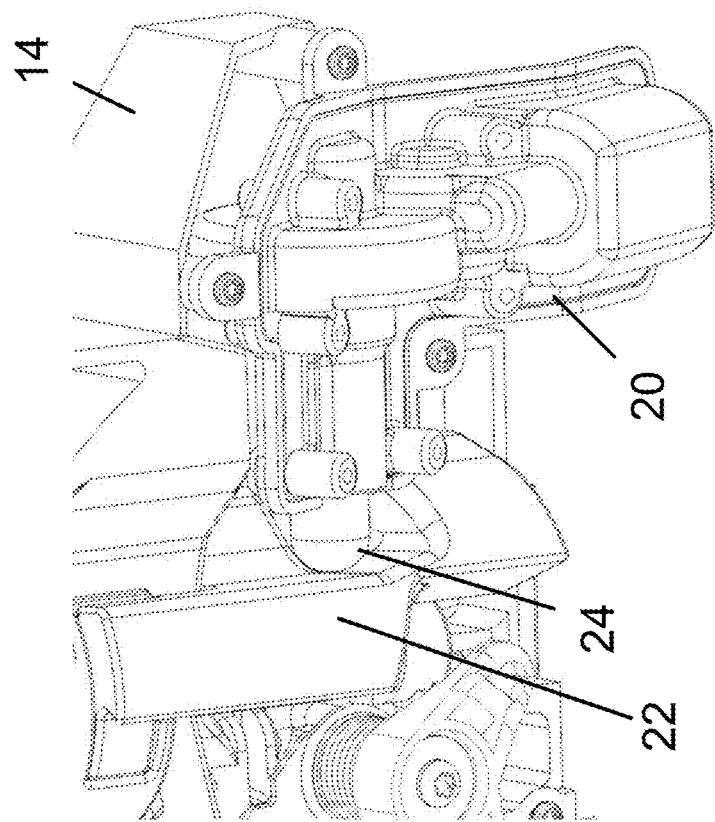
FIG. 5A is an enlarged perspective view of the actuator of FIG. 5.

Thus, the handle portion 16 is pivotally mounted to the bracket portion 14, such as via a hub or other pivoting connection, and the actuator engaging portion is rotationally fixed relative to the handle portion 16 so that, when the actuator 20 pivots the actuator engaging portion 22, the handle portion 16 pivots according to the force applied to the actuator engaging portion 22. In the illustrated embodiment, the actuator engaging portion 22 extends from the pivoting hub of the handle portion 16 and downward from the handle portion within the cavity of the door panel. The actuator 20 is mounted to the base portion 14 and operates to move the plunger 24 laterally to engage and pivot the actuator engaging portion 22. For example, as shown in FIGS. 5A and 6A, the actuator 20 operates to move the plunger 24 in a sideways direction (left in the illustrated embodiment) to move the actuator engaging portion 22 in the same sideways direction and pivot the handle portion 16 outward from the base portion 14 and door 12a of the vehicle.

Figure 10:
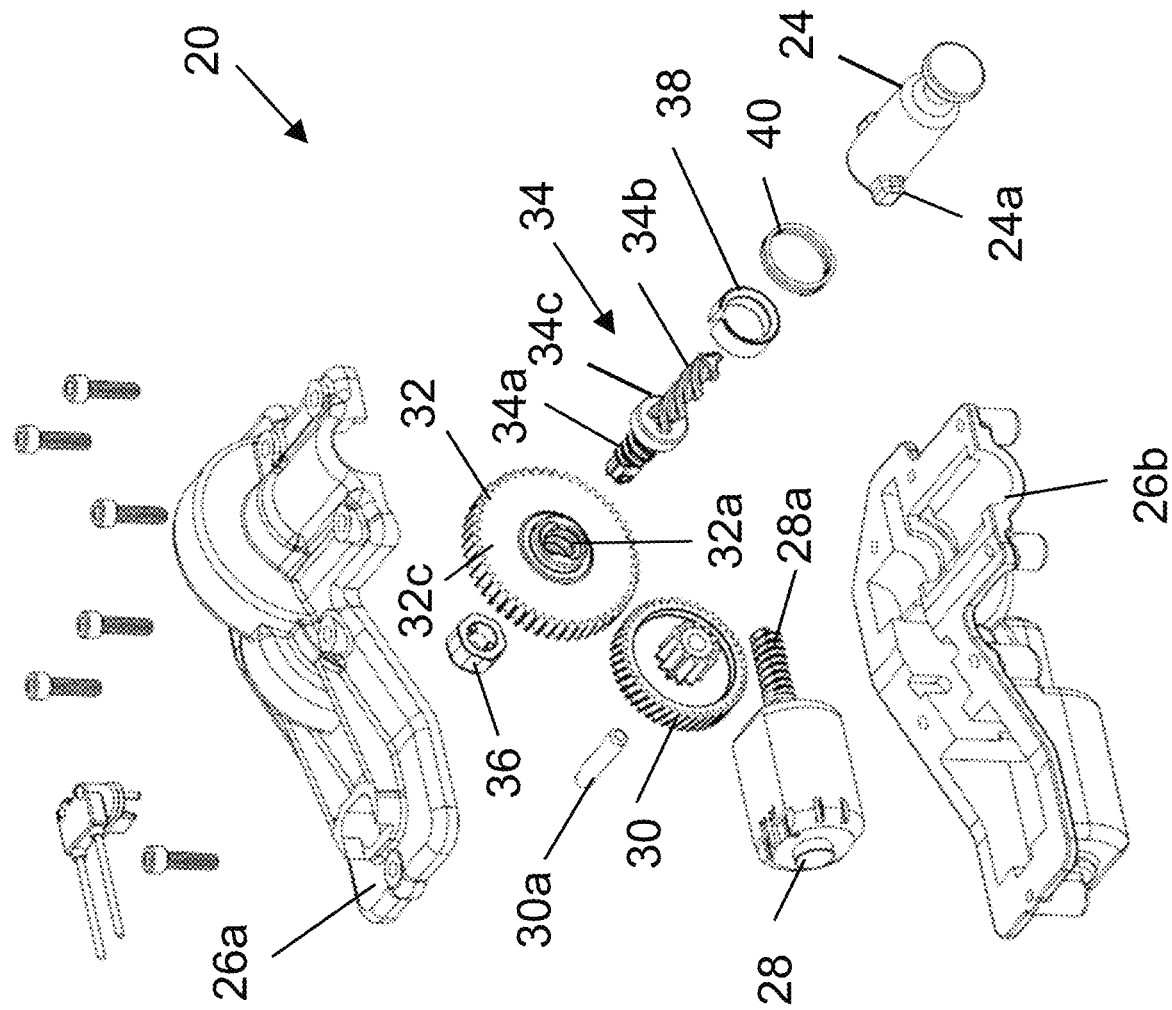
FIG. 10 is an exploded perspective view of the actuator.
Figure 12:
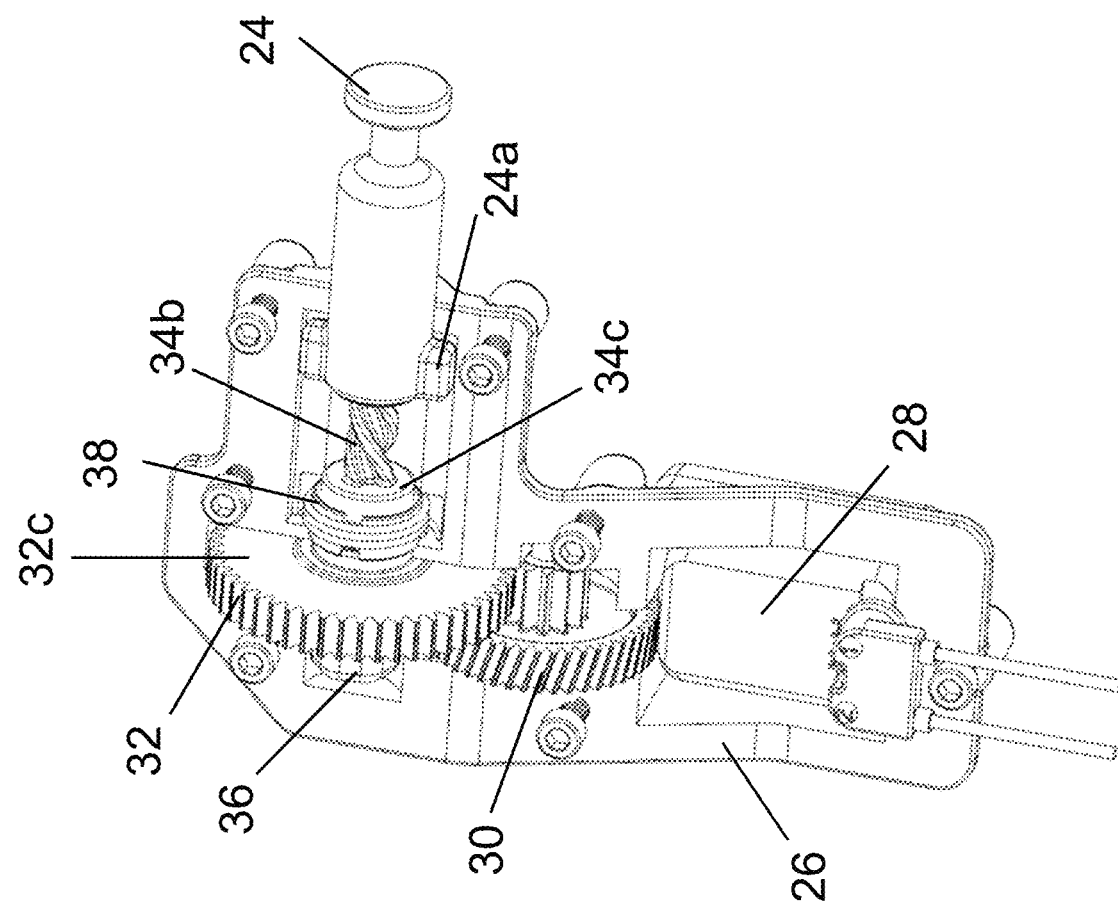
FIG. 12 is a perspective view of the actuator, with a housing portion removed.
Figure 11:
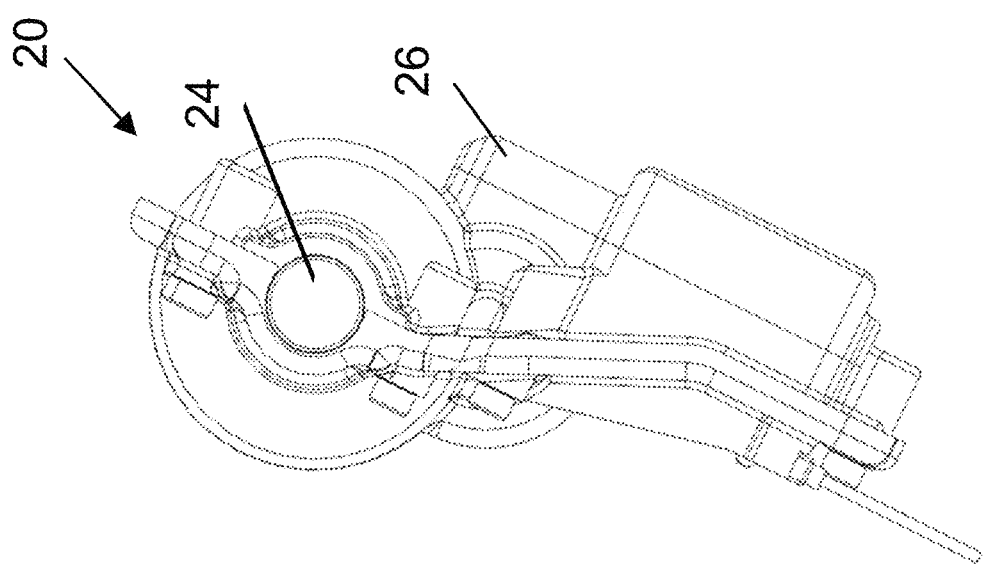
FIG. 11 is a side view of the actuator.

As shown in FIG. 10, the actuator 20 includes a housing 26 (that comprises a first housing portion 26a and a second housing portion 26b) that houses or accommodates an electrically operated motor 28 that rotatably drives a worm gear 28a. The worm gear 28a is engaged with a helical cluster gear 30 that is rotatably mounted at the housing via a pin or axle 30a. The helical cluster gear 30 includes a gear element that engages a spur gear 32, which is rotated when the motor is operated. The plunger 24 is movably coupled to the spur gear 32 via a variable lead screw 34, which is rotated at different speeds depending on its degree of extension relative to the spur gear. The plunger 24 includes one or more tabs or elements or wings 24a that are received in channels of the housing to limit or preclude rotation of the plunger as it is translationally moved via rotation of the variable lead screw 34 when the motor is operated. Optionally, the gear train rotatably connecting the motor 28 and the variable lead screw 34 responsible for translational movement of the plunger 24 may comprise any number of gears. For example, the worm gear 28a of the motor 28 may directly engage a gear element of the spur gear 32.

As can be seen with reference to FIGS. 10 and 12-18, the variable lead screw 34 includes a finer pitch gear end or portion 34a (that is rotatably received in an internal gear passageway 32a of the spur gear 32) and a coarser pitch gear end or portion 34b (that is rotatably received in an internal gear passageway 24b of the plunger 24), with a central portion 34c between the gear portions 34a, 34b. A cap 36 is disposed at the distal end of the finer pitch gear portion 34a distal from the central portion 34c, and a collar or ring 38 (with a wrap spring 40) is disposed at the spur gear 32 and is engaged with a protruding part of the spur gear 32 and is disposed around the central portion 34c of the variable lead screw when the lead screw 34 and plunger 24 are in the retracted state. The finer pitch gear portion 34a of the variable lead screw 34 passes through the internal gear 32a of the spur gear 32, with the cap 36 attached at the distal end of the lead screw 34 at a first side 32b of the spur gear 32, and with the collar or ring 38 disposed at the central portion 34c at a second side 32c of the spur gear 32 opposite the first side 32b and facing the plunger 24. The protruding part of the spur gear 32 at which the collar 38 is engaged circumscribes the opening of the internal gear 32a and protrudes from the second side 32c of the spur gear 32 towards the plunger 24.

Figure 14:
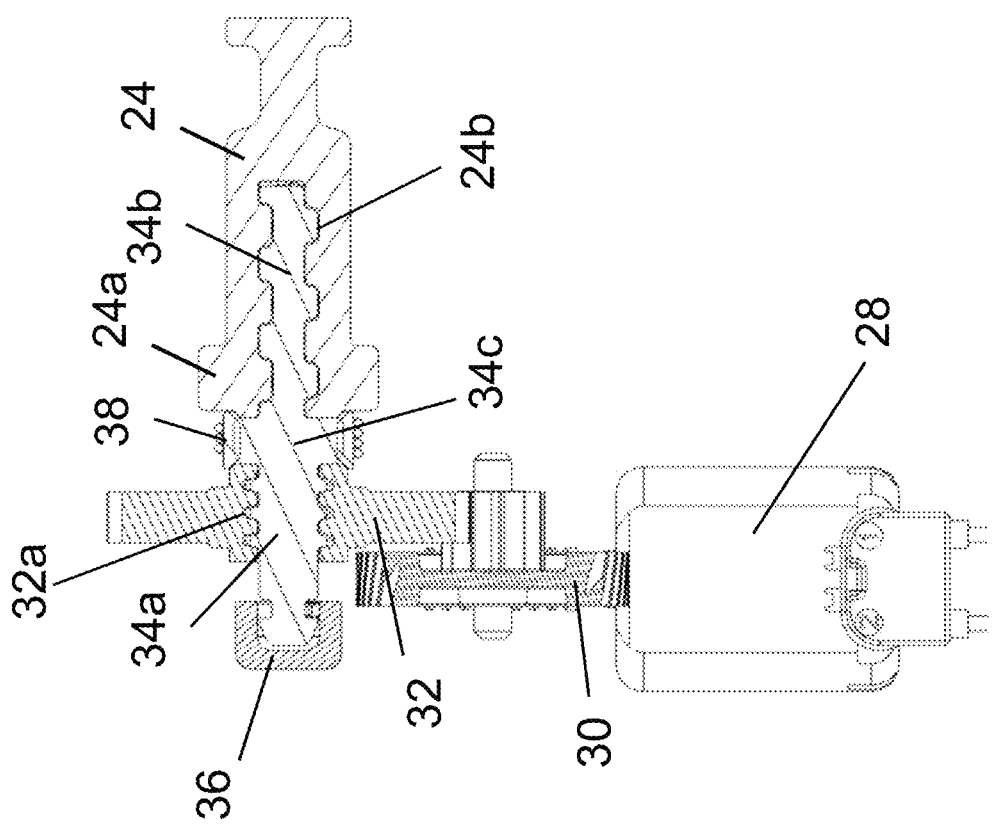
FIG. 14 is a sectional view of the actuator of FIG. 13.
Figure 13:
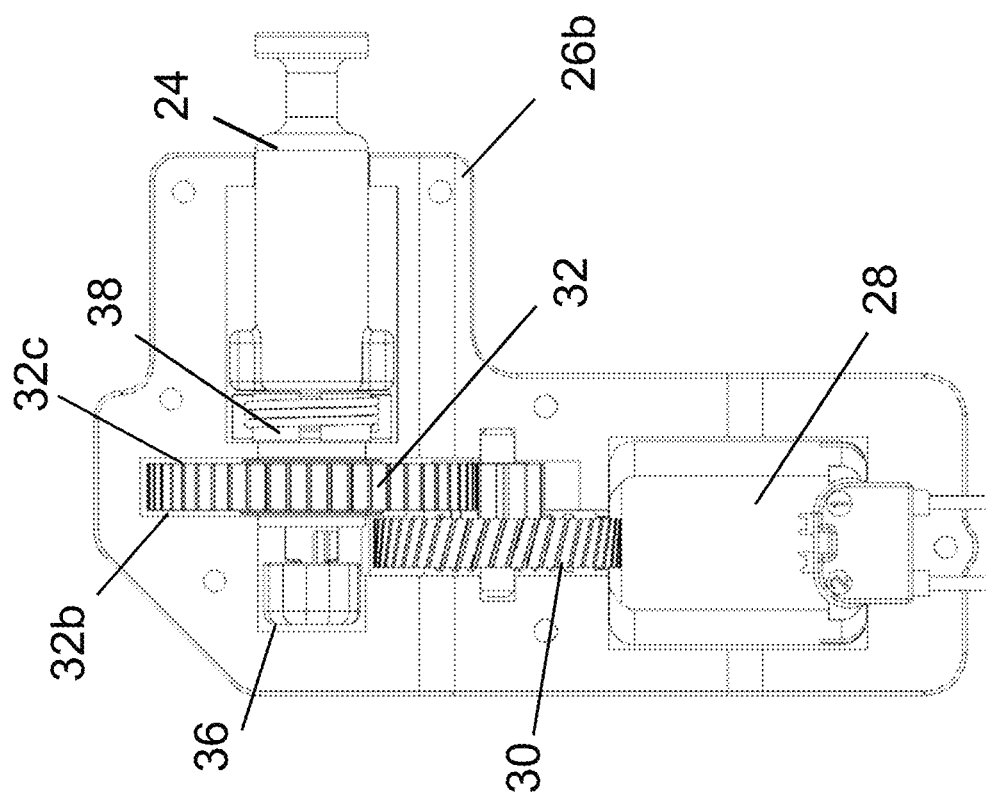
FIG. 13 is a plan view of the actuator, with the actuator retracted.
Figure 16:
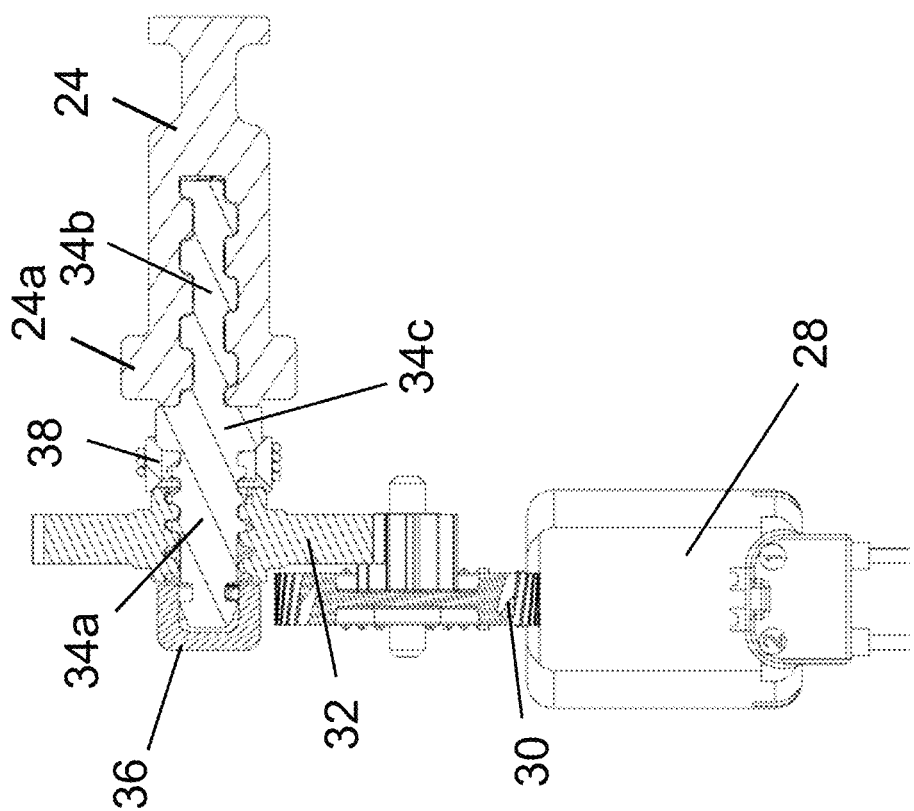
FIG. 16 is a sectional view of the actuator of FIG. 15.
Figure 15:
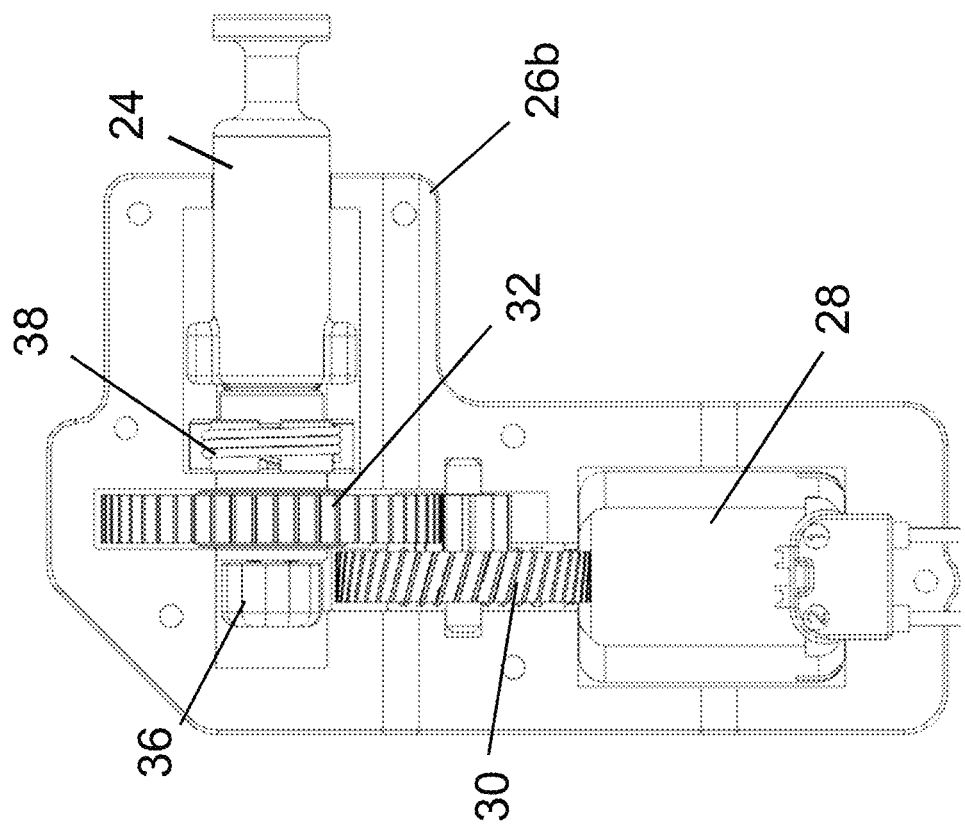
FIG. 15 is a plan view of the actuator, with the actuator partially extended via the high torque and low speed initial extension of the actuator.
Figure 20:
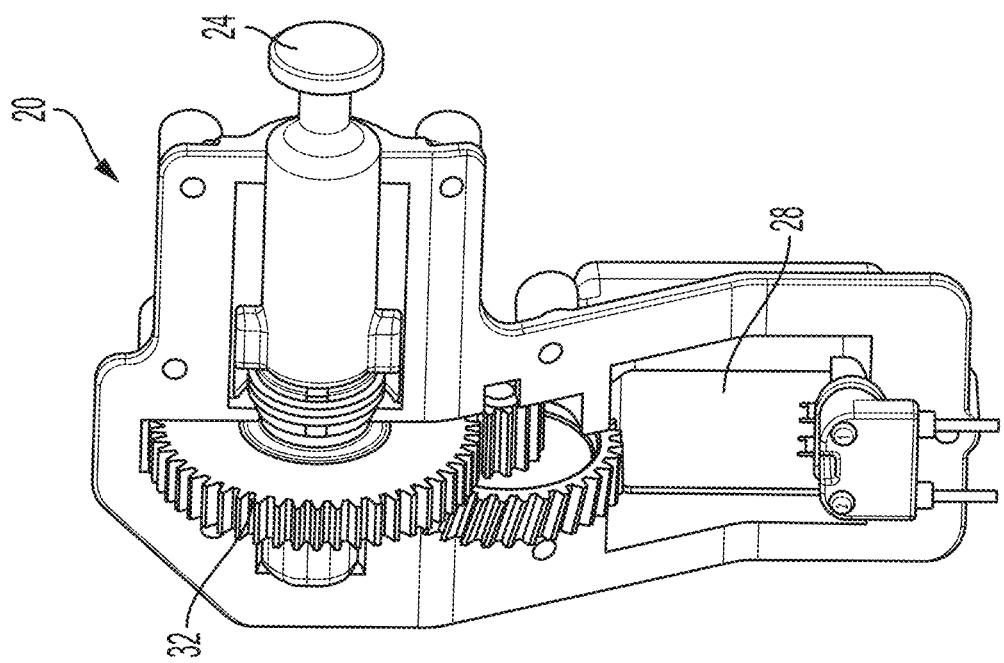
FIG. 20 is another perspective view of the actuator with one of the housing portions removed.
Figure 19:
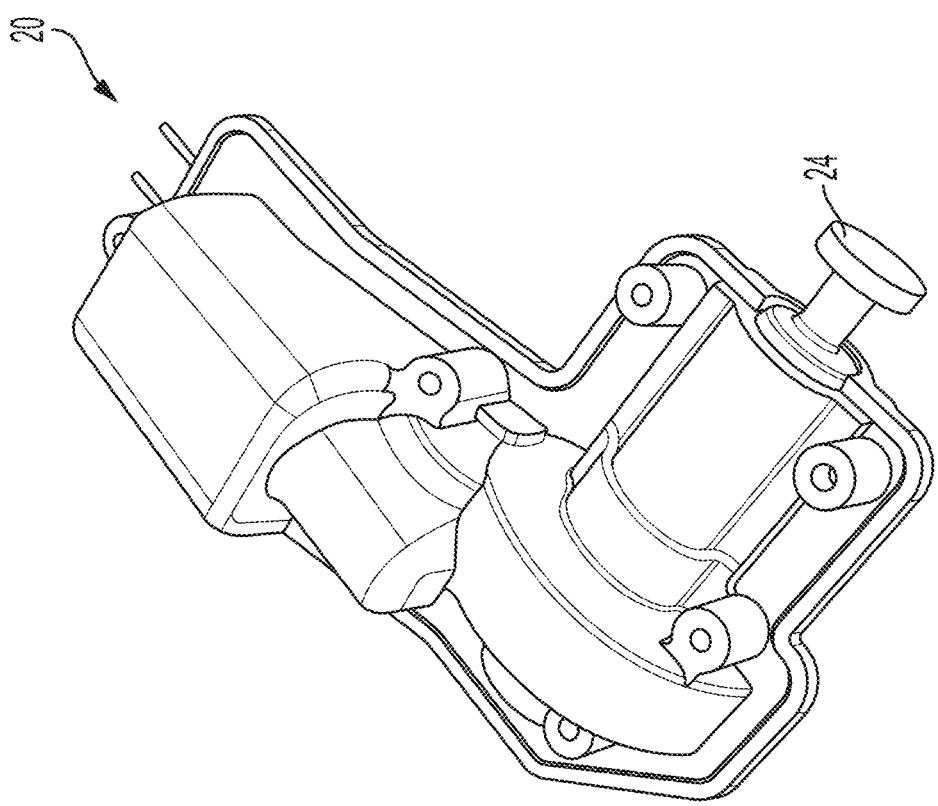
FIG. 19 is another perspective view of the actuator.
Figure 22:
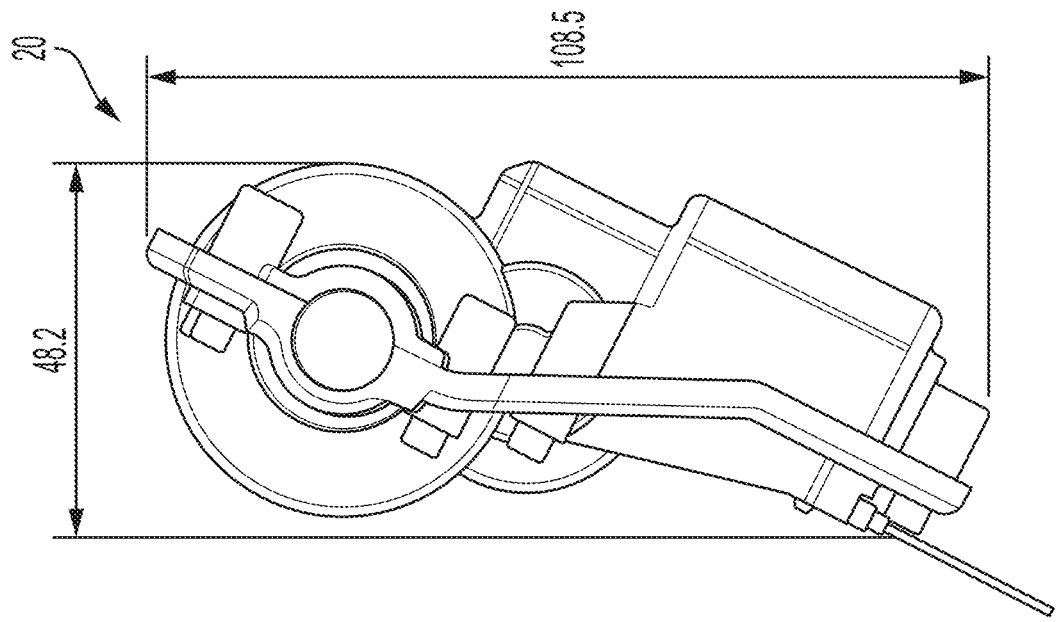
FIGS. 21 and 22 are views of the actuator, showing exemplary dimensions for the actuator.
Figure 21:
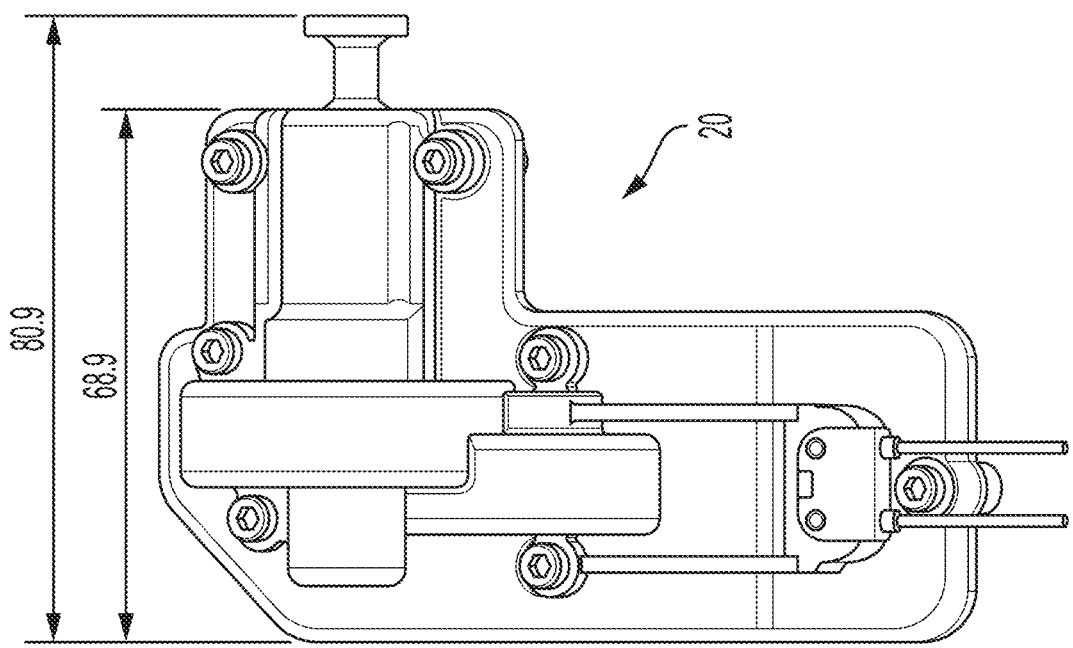
Figure 23:
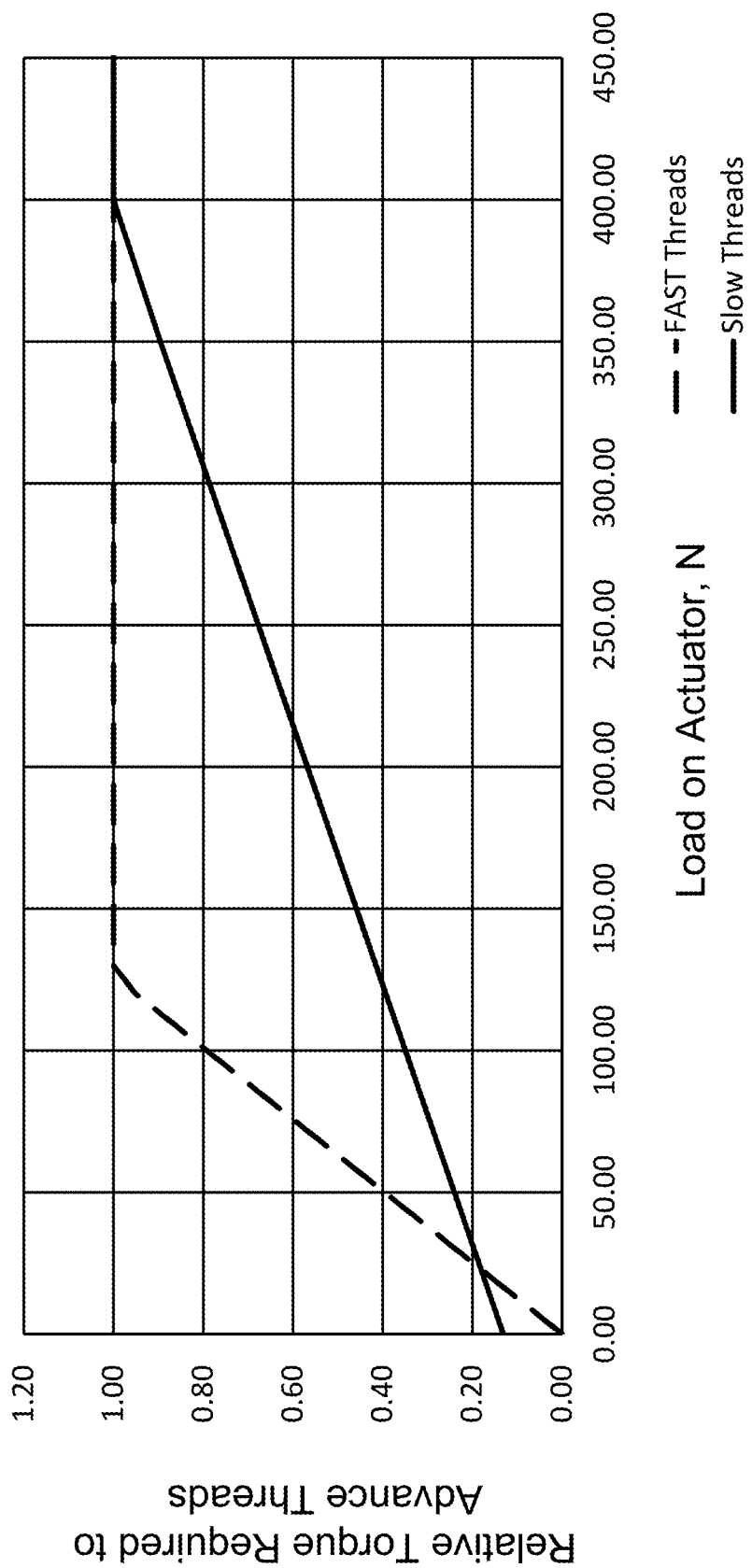
FIG. 23 is a chart showing torque and actuator load when the actuator is operating at the slow extension (slow threads) and at the fast extension (fast threads).

Thus, and such as shown in FIGS. 13 and 14, when the actuator 20 is retracted (and the handle portion 16 is in the flush state), the lead screw 34 is positioned so that the central portion 34c of the lead screw is at the second side 32c of the spur gear 32 and within the collar 38, and so that the distal end (and cap 36) of the finer pitch gear 34a is spaced from the first side 32b of the spur gear 32 and the coarser pitch gear 34b is disposed within the internal passageway 24b of the plunger 24 (i.e., the plunger 24 is retracted along the coarser pitch gear 34b). The collar 38 and spring 40 are retained within a channel of the housing 26 so that the collar 38 and spring 40 are at and against the second side 32c of the spur gear 32 and do not axially move (in a direction along a longitudinal axis of the plunger 24) during operation of the actuator 20.

Figure 7:
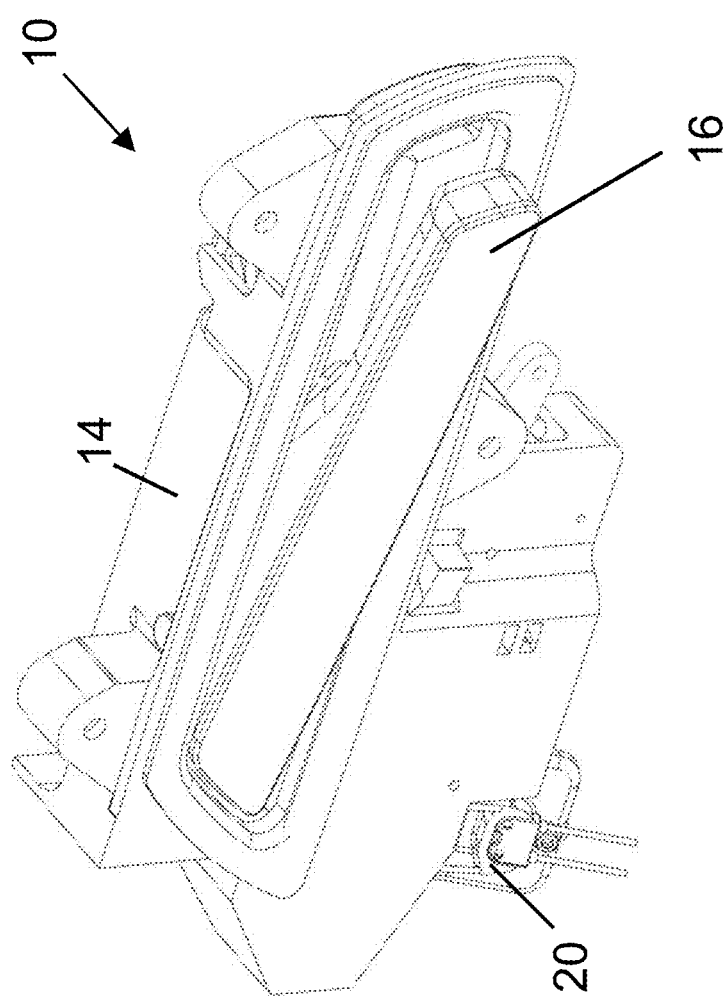
FIG. 7 is another perspective view of the extendable flush door handle assembly and actuator, shown with the handle in a partially deployed position.
Figure 8A:
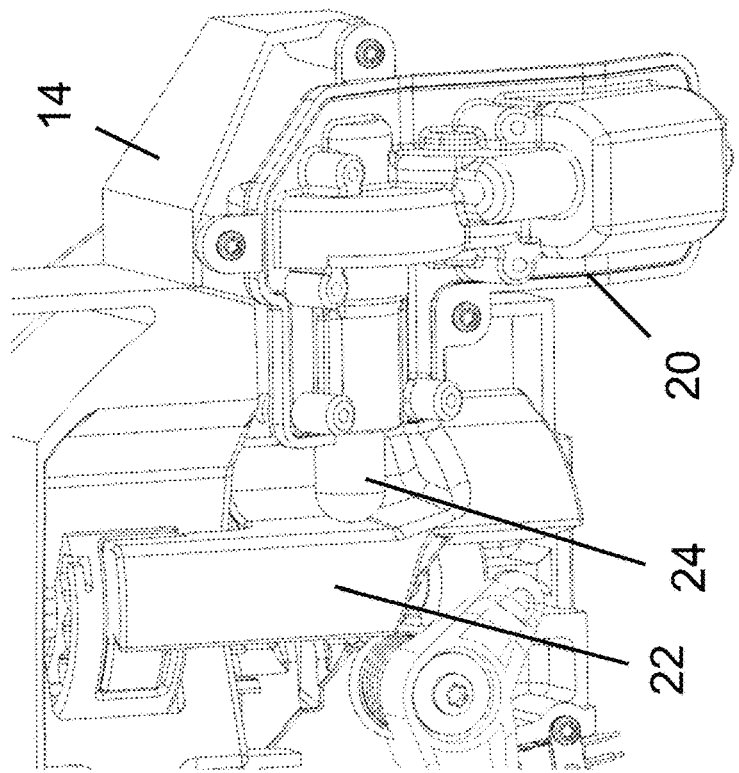
FIG. 8A is an enlarged perspective view of the actuator of FIG. 8.
Figure 8:
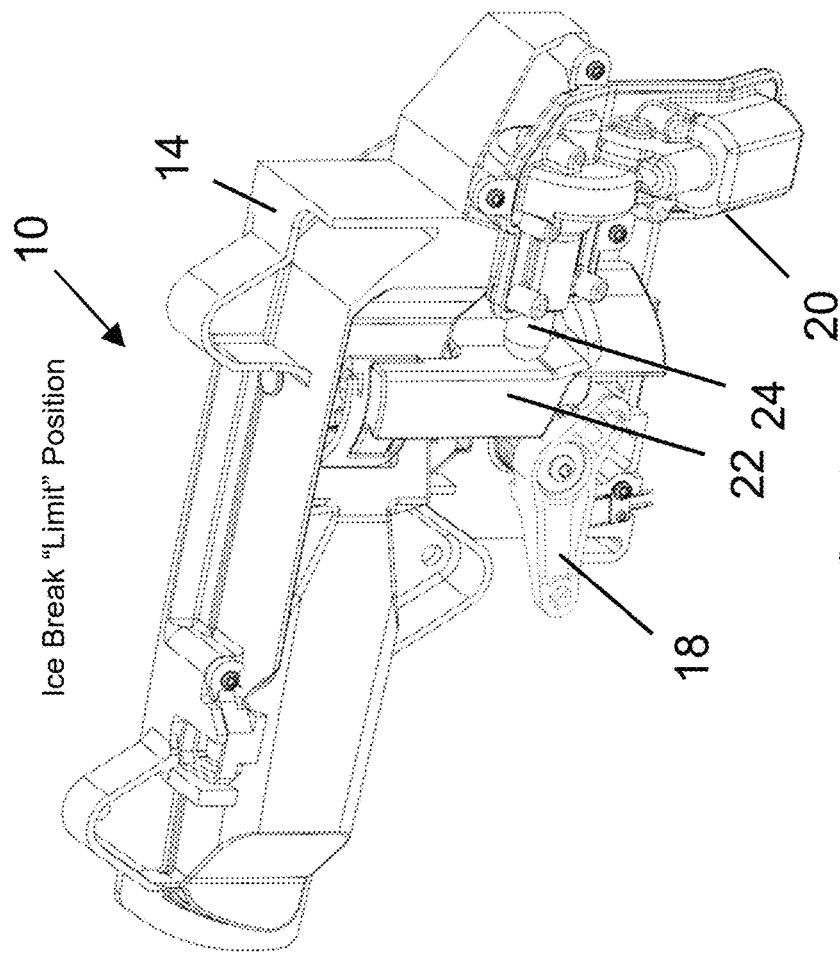
FIG. 8 is another perspective view of the extendable flush door handle assembly and actuator of FIG. 7.
Figure 9:
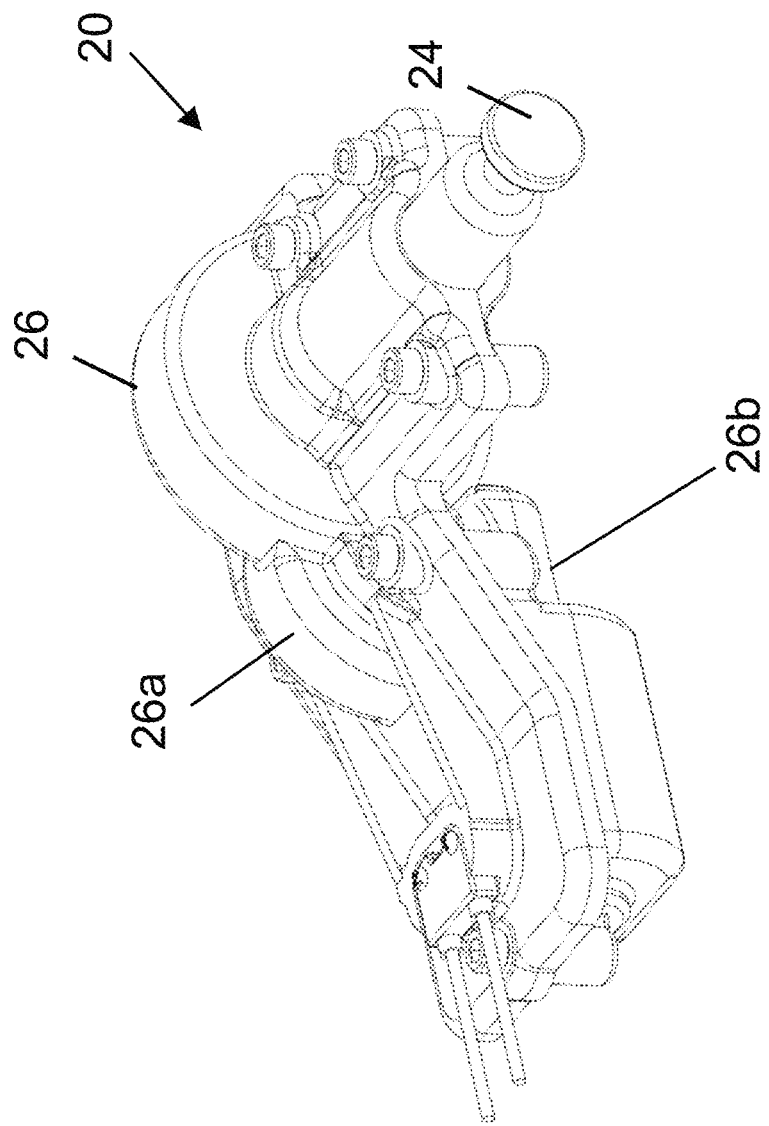
FIG. 9 is a perspective view of the actuator.

When the actuator 20 is initially operated to begin deploying the handle portion 16 from the flush state (see FIGS. 15 and 16), the spur gear 32 is rotated (via operation of the motor 28 and rotation of the gears 28a and 30), which causes the lead screw 34 to move longitudinally outward in a direction away from the second side 32c of the spur gear 32, with rotation and movement of the lead screw 34 limited or inhibited via the collar 38 and spring 40. In other words, as the spur gear 32 is rotated, rotation of the lead screw 34 relative to the spur gear 32 is at least initially limited or precluded by the biasing force of the collar 38 and spring 40 so that the lead screw 34 moves longitudinally relative to the spur gear 32 via engagement of the finer pitch gear portion 34a with the internal gear 32a of the spur gear 32. Thus, the finer pitch gears (i.e., the finer pitch gear portion 34a and the internal gear of the spur gear 32) function to move the lead screw 34 (and plunger 24) to a first extended or partially extended position, which as the plunger 24 acts on the actuator engaging portion 22, pivots the handle portion 16 partially outward (see FIGS. 7, 8 and 8A). As the lead screw 24 moves outward, the central portion 34c moves outward of the collar 38 (which is held stationary within the channel of the housing 26) and the cap 36 moves toward and into engagement with the first side 32a of the spur gear 32. This initial extension is achieved at a first, slower speed and a first, higher torque, and thus provides a greater pivoting force at the handle portion 16 that can break the handle portion free of ice or the like that may otherwise inhibit the initial deployment of the handle portion.

As shown in FIGS. 17 and 18, when the actuator is operated and the handle portion is in the partially deployed state, further operation of the motor (and thus further rotation of the gears 28a and 30 and further rotation of the spur gear 32) causes the lead screw 24 to rotate. This is because the central portion 34c is no longer clamped by the collar 38 and spring 40 and the end cap 36 precludes further longitudinal movement of the lead screw 24. The rotation of the lead screw 24 causes more rapid extension of the plunger 22 due to the rotation of the coarser pitch gear 34b within the internal gear 24b of the non-rotatable plunger 22. In other words, the pitch of the coarser pitch gear 34b is greater than the pitch of the finer pitch gear 34a (i.e., there is a greater distance traveled between grooves) so that less torque is applied through the plunger 24 and the plunger extends more rapidly when the lead screw 34 rotates within the passageway 24b of the plunger that engages the coarser pitch gear 34b. The extension of the plunger 24 when moving the handle portion from the partially deployed state toward the deployed state is achieved at a second speed (that is faster than the first speed) and a second torque (that is lower than the first torque). Thus, even though the motor revolutions per minute (RPM) may be the same, the rate of extension of the plunger 24 increases from the initial deployment (via longitudinal movement of the lead screw) to the later deployment (via rotation of the lead screw). The plunger 24 is precluded from rotating relative to the lead screw 34 via engagement of the fins 24a with the housing 26, and thus the plunger 24 translates along the lead screw 34 as the lead screw rotates.

Optionally, the collar 38 and spring 40 may provide a mode selection, where the friction between the collar 38 and the central portion 34c of the variable lead screw either causes the lead screw 34 to translate (by limiting or inhibiting rotation of the lead screw 34 so that rotation of the spur gear 32 rotates the spur gear 32 relative to the finer gear portion 34a and translates the lead screw 34 relative to the spur gear 32) when greater resistance to extension of the plunger 24 is encountered (such as when ice limits or inhibits deployment of the door handle) or causes the lead screw 34 to rotate with the spur gear 32 when less restriction to extension of the plunger 24 and deployment of the door handle is encountered. In other words, the collar 38 and spring 40 provide a resistance to the extension of the lead screw 34 relative to the spur gear 32 and thus extension of the plunger 24. Resistance may also be provided to extension of the plunger from outside sources, such as ice or other obstacles at the handle portion 16.

When there is resistance (e.g., greater than a threshold level) to extension of the plunger 24, the friction between the collar 38 and the lead screw 34 is overcome by the rotation of the lead screw 34 via the higher torque/lower speed gears (the lower pitch gear 34a and internal gear 32c of the spur gear 32), whereby the lower torque/higher speed gears (the higher pitch gear 34b and the passageway 24b of the plunger 24) do not function until the central portion 34c of the lead screw 34 is outside of the collar 38 or until the increased resistance is overcome (e.g., the handle breaks free of the ice). In other words, the resistance at the collar 38 may initially prevent the lead screw 34 from extending from the spur gear 32, but the increased external resistance may prevent the plunger 34 from extending from the lead screw 34. Thus, the lead screw 34 is unable to rotate relative to the plunger (via rotation of the spur gear 32) and the resistance load is experienced at the finer pitch gear portion 34a, causing the lead screw 34 to extend from the spur gear 32, overcoming the increased resistance.

When there is no increased resistance presence (e.g., when the handle is in the recessed state with no ice present), the friction between the collar 38 and the lead screw 34 is not overcome and rotation of the spur gear 32 also rotates the lead screw 34 (via the engagement of the collar 38 at the spur gear 32 and lead screw 34) so that the lower torque/higher speed gears function to more rapidly extend the door handle from the non-deployed or recessed position. That is, the biasing force of the collar 38 and spring 40 may be configured to only engage the lower pitch/higher torque gears when an outside or exterior resistance force (such as ice) is resisting extension of the plunger 24.

Optionally, the friction of the collar 38 at the lead screw 34 may be adjusted to engage the lower pitch/higher torque gears at a variable resistance, to either allow the lead screw 34 to rotate with the spur gear 32 or preclude rotation of the lead screw 34 relative to the spur gear 32. For example, the biasing member 40 may comprise a shoe or band that is tightened around the collar 38 to increase the biasing force. Optionally, the biasing force at the collar 38 may be configured to allow the lead screw 34 to begin slipping (i.e., rotating relative to the collar 38) when the central portion 34c is only partially outside of the collar 38.

The collar or ring of the actuator provides for mode selection and will limit rotation of the lead screw until the central portion is at least partially moved out of the collar. Thus, when deploying the actuator when no ice or foreign material is present at the handle mechanism, that causes the higher efforts on the actuator (i.e., when the actuator is just overcoming a spring force that keeps the handle in the flush state), the actuator is initially retracted and the mode select ring is wrapped around the central portion of the variable lead screw. Once the motor is powered, the mode select ring will cause friction which prevents the low lead screw pair from moving or, in other words, the variable lead screw and spur gear will rotate together. The torque from the spur gear will get transmitted to the variable lead screw, which will cause the higher lead screw pair (the plunger at the higher pitch gear of the variable lead screw) to translate which in turn deploys the handle very fast. Once the handle and/or the plunger gets to the end of travel, the power to the actuator should be removed to stop the motor. Optionally, there may be a position feedback on the plunger or on the handle to send information back to the controller to shut off the power.

With the handle deployed, the actuator can be operated to retract the plunger to allow the handle to return to the flush position. Once the motor is powered in the other direction, the variable lead screw will already be in its non-extended position and the torque from the spur gear will then again get transmitted to the variable lead screw and will make the high lead screw pair move relative to one another. The plunger thus will retract at the higher speed. Since the handle is spring-loaded toward the flush state, the handle will also retract. Optionally, a positional feedback signal may be used to send a signal to the controller to stop the motor.

When the actuator operates in an ice breaking mode (where something, such as ice, beyond the spring force is holding the handle in the flush position), the actuator, when initially actuated, is again retracted and the mode select ring is wrapped around the central portion of the variable lead screw. The actuator is powered and the mode select ring will cause friction which prevents the low lead screw pair from moving. However, due to the increased force at the plunger (resisting extension of the plunger), the higher lead screw pair will also not be able to move. This causes the DC motor to generate more torque which will overcome the friction between the mode select ring and the variable lead screw. Now the low lead screw will extend the variable lead screw and the plunger outward at the very low speed but with the ability to apply a much higher load. The cap at the back of the variable lead screw limits the linear travel of the variable lead screw relative to the spur gear. Once it reaches its limit, the mode select ring also shrinks in diameter around the variable lead screw. In other words, as the lead screw 34 extends from the spur gear 32, the collar 38 has less engagement area with the lead screw 34 and thus applies less biasing force. After the ice has been broken, the higher speed setting will be able to move the plunger and the handle. The higher lead screw pair takes over and the actuator continues to extend at the faster speed until the plunger/handle reaches the end of travel.

With the handle deployed, the actuator can be operated to retract the plunger to allow the handle to return to the flush position. Once the motor is powered in the other direction, the mode select ring will limit or prevent the lower helical pair from moving/translating, which causes the higher lead screw pair to retract the handle quickly until the plunger hits the end of travel on the variable lead screw. Then the low helical pair will start to expand the mode select ring and retract the handle and plunger until the plunger and/or the handle is/are in the retracted position and trigger the positional feedback sensor.

Optionally, the actuator may not include the mode select ring or collar and spring. In such an embodiment, during deployment the actuator will always extend slowly using the low helical pair first until the cap reaches the spur gear. Then the high helical pair will finish the rest of the travel at a higher speed. During retracting of the plunger, with nothing to prevent movement between the lower helical pair, the variable lead screw and plunger will translate relative to the spur gear at a slow speed until the center portion of the variable lead screw hits the spur gear. Then the high helical pair will finish the rest of the travel at a higher speed.

Thus, the flush door handle actuator provides increased ice breaking torques (and force applied by the output element at the door handle portion) without increasing deployment time or sound levels. The actuator may change its "gear ratio" depending on the load of the actuator. Thus, at higher load requirements (such as at initial deployment when the handle portion may be stuck or frozen), the higher gear ratio gears operate at lower speeds, and at normal or lower load requirements, the lower gear ratios operate at higher speeds (while the motor itself operates at the same speed). The actuator uses two different thread pitches to achieve the higher force output in the beginning and higher speed towards the end of the extension or travel. The variable gear allows for the higher force output without sacrificing overall deployment speed. The actuator achieves this in a smaller package and with reduced weight as compared to known actuators.

Although shown as a strap type handle, the handle assembly may comprise any suitable type of vehicle door handle assembly, such as a paddle type vehicle door handle assembly (having a paddle or handle portion that is pivotable about a generally horizontal pivot axis to open the vehicle door) and/or such as a handle assembly of the types described in U.S. Pat. Nos. 6,349,450; 6,550,103 and/or 6,907,643, which are hereby incorporated herein by reference in their entireties) or other type of vehicle door handle assembly. Optionally, the door handle assembly may include a soft touch handle portion, such as utilizing the principles described in U.S. Pat. Nos. 6,349,450; 6,550,103 and/or 6,907,643, incorporated above.

Although shown and described as being a generally horizontally oriented handle portion that pivots about a generally vertical pivot axis, it is envisioned that the handle of the extendable flush door handle assembly may be oriented in any manner. For example, the handle may be oriented so that it is either vertical, horizontal, or diagonal with respect to the ground. Also, although shown and described as an exterior door handle for opening a side door or rear door or lift gate of a vehicle from exterior the vehicle, it is envisioned that the extendable flush door handle assembly may be suitable for use as an interior handle for opening a side door or rear door or liftgate of a vehicle from inside the vehicle.

Optionally, the door handle assembly or module may incorporate other features or accessories, such as, for example, a blind spot indicator device or element and/or a turn signal indicator device or element, such as by utilizing aspects of the devices described in U.S. Pat. Nos. 8,786,704; 8,058,977; 7,944,371; 7,492,281; 6,198,409; 5,929,786 and/or 5,786,772, which are hereby incorporated herein by reference in their entireties. The signal indicator or indication module may include or utilize aspects of various light modules or systems or devices, such as the types described in U.S. Pat. Nos. 7,626,749; 7,581,859; 6,227,689; 6,582,109; 5,371,659; 5,497,306; 5,669,699; 5,823,654; 6,176,602 and/or 6,276,821, which are hereby incorporated herein by reference in their entireties.

Optionally, the door handle assembly or module may include or may be associated with an antenna for receiving signals from or communicating with a remote device. For example, the antenna (such as, for example, an antenna of the types described in U.S. Pat. No. 6,977,619 and/or U.S. Publication No. US-2010-0007463, which are hereby incorporated herein by reference in their entireties) may communicate a signal to the door locking system via a wire connection or the like, or wirelessly, such as via a radio frequency signal or via an infrared signal or via other wireless signaling means. For example, the handle assembly may include an antenna or sensor (such as an antenna and/or capacitive sensor) at the handle portion and/or may include a passive entry device or element. The antenna or sensor and/or passive entry device may receive a signal from a transmitting device (such as from a key fob or the like carried by the driver of the vehicle) and/or may sense or detect the presence of or proximity of a person or person's hand at or near the door handle, and may generate an output signal indicative of such detection. The actuator may be responsive to the antenna and/or sensor and/or device to impart an outward movement of the door handle portion so that the user can grasp the handle portion to open the door of the vehicle.

Such connections can include cables, wires, fiber optic cables or the like. The communication to the locking system may be via a vehicle bus or multiplex system, such as a LIN (Local Interconnect Network) or CAN (Car or Controlled Area Network) system, such as described in U.S. Pat. Nos. 6,291,905; 6,396,408 and/or 6,477,464, which are all hereby incorporated herein by reference in their entireties. The vehicle door may then be unlocked and/or the illumination source or sources may be activated as a person carrying a remote signaling device approaches the door handle. Optionally, other systems may be activated in response to the remote signaling device, such as vehicle lighting systems, such as interior lights, security lights or the like (such as security lights of the types disclosed in U.S. Pat. Nos. 6,280,069; 6,276,821; 6,176,602; 6,152,590; 6,149,287; 6,139,172; 6,086,229; 5,938,321; 5,671,996; 5,497,305; 6,416,208 and/or 6,568,839, all of which are hereby incorporated herein by reference in their entireties), or the vehicle ignition, or any other desired system.

Changes and modifications to the specifically described embodiments may be carried out without departing from the principles of the present invention, which is intended to be limited only by the scope of the appended claims as interpreted according to the principles of patent law.

The invention claimed is:

1. A vehicular exterior door handle assembly, the vehicular exterior door handle assembly comprising:
   a base portion disposed at a door handle region of a vehicle door;
   a handle portion including a base end and a grasping portion;
   wherein the handle portion is movable relative to the base portion between a recessed position, where the grasping portion of the handle portion is recessed at the base portion and not graspable by a user, and a deployed position, where the grasping portion of the handle portion protrudes outward from the base portion and is graspable by the user;
   an actuator, the actuator comprising (i) an electrically-operable motor, (ii) an output element mechanically coupled to the handle portion, and (iii) a variable drive element coupled to the electrically-operable motor and the output element;
   a connection connected between the electrically-operable motor and the variable drive element;
   wherein the electrically-operable motor is electrically operated in response to an input signal;
   wherein the actuator, when the electrically-operable motor is electrically operated, drives the variable drive element to move the output element;
   wherein the actuator, when the electrically-operable motor is electrically operated, moves the output element to move the handle portion between the recessed position and the deployed position;
   wherein, when the electrically-operable motor is electrically operated to move the handle portion from the recessed position toward the deployed position, the connection is engaged so that the connection limits the output element to move at a first speed to move the handle portion from the recessed position toward a partially deployed position; and
   wherein, when the electrically-operable motor is electrically operated to further move the handle portion from the partially deployed position toward the deployed position, the connection is disengaged so that the output element moves at a second speed that is faster than the first speed to more rapidly move the handle portion from the partially deployed position toward the deployed position.

2. The vehicular exterior door handle assembly of claim 1, wherein the variable drive element comprises (i) a lower pitch gear element that engages an internal gear of a drive gear that, when the electrically-operable motor is electrically operated, is rotatably driven by the electrically-operable motor, and (ii) a higher pitch gear element that engages an internal gear of the output element.

3. The vehicular exterior door handle assembly of claim 2, wherein, when the electrically-operable motor is electrically operated to move the handle portion from the recessed position, the drive gear is rotatably driven to translationally move the variable drive element and the output element together and in tandem at the first speed and to move the handle portion toward the partially deployed position.

4. The vehicular exterior door handle assembly of claim 3, wherein rotation of the drive gear translationally moves the variable drive element via rotation of the internal gear of the drive gear about the lower pitch gear element.

5. The vehicular exterior door handle assembly of claim 3, wherein the connection comprises a spring-biased ring disposed at the variable drive element to limit rotation of the variable drive element so that the variable drive element translationally moves to move the output element and to move the handle portion from the recessed position toward the partially deployed position.

6. The vehicular exterior door handle assembly of claim 3, wherein the actuator comprises a stop element at a distal end of the lower pitch gear element of the variable drive element to limit translational movement of the variable drive element relative to the drive gear as the variable drive element moves the output element to move the handle portion toward the deployed position.

7. The vehicular exterior door handle assembly of claim 6, wherein the stop element at the distal end of the lower pitch gear element of the variable drive element limits translational movement of the variable drive element relative to the drive gear by engaging a side portion of the drive gear.

8. The vehicular exterior door handle assembly of claim 7, wherein, with the stop element engaged with the side portion of the drive gear, further rotation of the drive gear rotates the variable drive element and translationally moves the output element via rotation of the higher pitch gear element within the internal gear of the output element.

9. The vehicular exterior door handle assembly of claim 3, wherein, when the electrically-operable motor is further electrically operated to further move the handle portion from the partially deployed position toward the deployed position, the drive gear is rotatably driven to rotate the variable drive element to translationally move the output element at the second speed to move the handle portion from the partially deployed position toward the deployed position.

10. The vehicular exterior door handle assembly of claim 9, wherein rotation of the variable drive element translationally moves the output element via rotation of the higher pitch gear element within the internal gear of the output element.

11. The vehicular exterior door handle assembly of claim 2, wherein the actuator comprises a housing that accommodates the electrically-operable motor, the drive gear, and the variable drive element, and wherein the output element is non-rotatably disposed at the housing.

12. The vehicular exterior door handle assembly of claim 1, wherein, when the electrically-operable motor is electrically operated to move the handle portion from the recessed position, and responsive to resistance to movement of the handle portion from the recessed position being less than or equal to a threshold resistance, the connection is disengaged so that the output element moves at the second speed and the output element does not move at the first speed when moving the handle portion from the recessed position toward the partially deployed position.

13. The vehicular exterior door handle assembly of claim 12, wherein, when the electrically-operable motor is electrically operated to move the handle portion from the recessed position, and responsive to resistance to movement of the handle portion from the recessed position being above the threshold resistance, the connection is engaged and the output element moves at the first speed when moving the handle portion from the recessed position toward the partially deployed position.

14. The vehicular exterior door handle assembly of claim 1, wherein the output element engages a portion of the handle portion and, as the output element is moved when the electrically-operable motor is electrically operated, the output element pivots the handle portion from the recessed position toward the deployed position.

15. The vehicular exterior door handle assembly of claim 1, wherein the actuator comprises an output gear, and wherein, when the electrically-operable motor is electrically operated, an output shaft of the electrically-operable motor rotates the output gear to move the handle portion between the recessed position and the deployed position.

16. The vehicular exterior door handle assembly of claim 1, wherein the output element provides a higher torque at the handle portion when the output element moves at the first speed than when the output element moves at the second speed.

17. A vehicular exterior door handle assembly, the vehicular exterior door handle assembly comprising:
 a base portion disposed at a door handle region of a vehicle door;
 a handle portion including a base end and a grasping portion;
 wherein the handle portion is movable relative to the base portion between a recessed position, where the grasping portion of the handle portion is recessed at the base portion and not graspable by a user, and a deployed position, where the grasping portion of the handle portion protrudes outward from the base portion and is graspable by the user;
 an actuator, the actuator comprising (i) an electrically-operable motor, (ii) an output element mechanically coupled to the handle portion, and (iii) a variable drive element coupled to the electrically-operable motor and the output element;
 a connection connected between the electrically-operable motor and the variable drive element;
 wherein the actuator, when the electrically-operable motor is electrically operated, drives the variable drive element to move the output element;
 wherein the variable drive element comprises (i) a lower pitch gear element that engages an internal gear of a drive gear that, when the electrically-operable motor is electrically operated, is rotatably driven by the electrically-operable motor, and (ii) a higher pitch gear element that engages an internal gear of the output element;
 wherein the electrically-operable motor is electrically operated in response to an input signal;
 wherein the actuator, when the electrically-operable motor is electrically operated, moves the output element to move the handle portion between the recessed position and the deployed position;
 wherein, when the electrically-operable motor is electrically operated to move the handle portion from the recessed position toward the deployed position, the connection is engaged so that the connection limits the output element to move at a first speed to move the handle portion from the recessed position toward a partially deployed position;
 wherein, when the electrically-operable motor is electrically operated to further move the handle portion from the partially deployed position toward the deployed position, the connection is disengaged so that the output element moves at a second speed that is faster than the first speed to more rapidly move the handle portion from the partially deployed position toward the deployed position; and wherein the output element provides a higher torque at the handle portion when the output element moves at the first speed than when the output element moves at the second speed.

18. The vehicular exterior door handle assembly of claim 17, wherein, when the electrically-operable motor is electrically operated to move the handle portion from the recessed position, the drive gear is rotatably driven to translationally move the variable drive element and the output element together and in tandem at the first speed and to move the handle portion toward the partially deployed position, and wherein rotation of the drive gear translationally moves the variable drive element via rotation of the internal gear of the drive gear about the lower pitch gear element.

19. The vehicular exterior door handle assembly of claim 18, wherein the connection comprises a spring-biased ring disposed at the variable drive element to limit rotation of the variable drive element so that the variable drive element translationally moves to move the output element and to move the handle portion from the recessed position toward the partially deployed position.

20. The vehicular exterior door handle assembly of claim 18, wherein the actuator comprises a stop element at a distal end of the lower pitch gear element of the variable drive element to limit translational movement of the variable drive element relative to the drive gear as the variable drive element moves the output element to move the handle portion toward the deployed position.

21. The vehicular exterior door handle assembly of claim 20, wherein the stop element at the distal end of the lower pitch gear element of the variable drive element limits translational movement of the variable drive element relative to the drive gear by engaging a side portion of the drive gear, and wherein, with the stop element engaged with the side portion of the drive gear, further rotation of the drive gear rotates the variable drive element and translationally moves the output element via rotation of the higher pitch gear element within the internal gear of the output element.

22. The vehicular exterior door handle assembly of claim 18, wherein, when the electrically-operable motor is further electrically operated to further move the handle portion from the partially deployed position toward the deployed position, the drive gear is rotatably driven to rotate the variable drive element to translationally move the output element at the second speed to move the handle portion from the partially deployed position toward the deployed position, and wherein rotation of the variable drive element translationally moves the output element via rotation of the higher pitch gear element within the internal gear of the output element.

23. The vehicular exterior door handle assembly of claim 17, wherein, when the electrically-operable motor is electrically operated to move the handle portion from the recessed position, and responsive to resistance to movement of the handle portion from the recessed position being less than or equal to a threshold resistance, the connection is disengaged so that the output element moves at the second speed and the output element does not move at the first speed when moving the handle portion from the recessed position toward the partially deployed position, and wherein, when the electrically-operable motor is electrically operated to move the handle portion from the recessed position, and responsive to resistance to movement of the handle portion from the recessed position being above the threshold resistance, the connection is engaged so that the output element moves at the first speed when moving the handle portion from the recessed position toward the partially deployed position.

24. A vehicular exterior door handle assembly, the vehicular exterior door handle assembly comprising:
a base portion disposed at a door handle region of a vehicle door;
a handle portion including a base end and a grasping portion;
wherein the handle portion is movable relative to the base portion between a recessed position, where the grasping portion of the handle portion is recessed at the base portion and not graspable by a user, and a deployed position, where the grasping portion of the handle portion protrudes outward from the base portion and is graspable by the user;
an actuator, the actuator comprising (i) an electrically-operable motor, (ii) an output element mechanically coupled to the handle portion, and (iii) a variable drive element coupled to the electrically-operable motor and the output element;
a connection connected between the electrically-operable motor and the variable drive element;
wherein the electrically-operable motor is electrically operated in response to an input signal;
wherein the actuator, when the electrically-operable motor is electrically operated, drives the variable drive element to move the output element;
wherein the actuator, when the electrically-operable motor is electrically operated, moves the output element to move the handle portion between the recessed position and the deployed position;
wherein the output element provides a higher force at the handle portion when the output element moves at a first speed than when the output element moves at a second speed, the second speed being faster than the first speed;
wherein, when the electrically-operable motor is electrically operated to move the handle portion from the recessed position toward the deployed position, and responsive to resistance to movement of the handle portion from the recessed position being above a threshold resistance, the connection is engaged so that the connection limits the output element to move at the first speed to move the handle portion from the recessed position toward a partially deployed position;
wherein, when the electrically-operable motor is electrically operated to further move the handle portion from the partially deployed position toward the deployed position, the connection is disengaged so that the output element moves at the second speed to more rapidly move the handle portion from the partially deployed position toward the deployed position; and
wherein, when the electrically-operable motor is electrically operated to move the handle portion from the recessed position toward the deployed position, and responsive to resistance to movement of the handle portion from the recessed position being less than or equal to the threshold resistance, the connection is disengaged so that the output element moves at the second speed when moving the handle portion from the recessed position toward the deployed position.

25. The vehicular exterior door handle assembly of claim 24, wherein the variable drive element comprises (i) a lower pitch gear element that engages an internal gear of a drive gear that, when the electrically-operable motor is electrically operated, is rotatably driven by the electrically-operable motor, and (ii) a higher pitch gear element that engages an internal gear of the output element.

26. The vehicular exterior door handle assembly of claim 25, wherein, when the electrically-operable motor is electrically operated to move the handle portion from the recessed position, and responsive to resistance to movement of the handle portion from the recessed position being above the threshold resistance, the drive gear is rotatably driven to translationally move the variable drive element and the output element together and in tandem at the first speed and to move the handle portion toward the partially deployed position.

27. The vehicular exterior door handle assembly of claim 26, wherein, when the electrically-operable motor is further electrically operated to further move the handle portion from the partially deployed position toward the deployed position, the drive gear is rotatably driven to rotate the variable drive element to translationally move the output element at the second speed to move the handle portion from the partially deployed position toward the deployed position.

28. The vehicular exterior door handle assembly of claim 25, wherein the connection comprises a spring-biased ring disposed at the variable drive element to limit rotation of the variable drive element so that the variable drive element translationally moves to move the output element and to move the handle portion from the recessed position toward the partially deployed position.

29. The vehicular exterior door handle assembly of claim 25, wherein the actuator comprises a stop element at a distal end of the lower pitch gear element of the variable drive element to limit translational movement of the variable drive element relative to the drive gear as the variable drive element moves the output element to move the handle portion toward the deployed position.

30. The vehicular exterior door handle assembly of claim 24, wherein, when the electrically-operable motor is electrically operated to move the handle portion from the recessed position toward the deployed position, and responsive to resistance to movement of the handle portion from the recessed position being above the threshold resistance, the actuator transitions from moving the output element at the first speed to moving the output element at the second speed responsive to the resistance to movement of the handle portion as the handle portion moves toward the deployed position being at or below the threshold resistance.

31. The vehicular exterior door handle assembly of claim 24, wherein, when the electrically-operable motor is electrically operated to move the handle portion from the recessed position toward the deployed position, and responsive to resistance to movement of the handle portion from the recessed position being above the threshold resistance, the actuator transitions from moving the output element at the first speed to moving the output element at the second speed responsive to the variable drive element moving a threshold distance toward the deployed position.

32. The vehicular exterior door handle assembly of claim 24, wherein the output element engages a portion of the handle portion and, as the output element is moved when the electrically-operable motor is electrically operated, the output element pivots the handle portion from the recessed position toward the deployed position.

\* \* \* \* \*